(12) United States Patent
Chowdhary et al.

(10) Patent No.: US 10,725,746 B2
(45) Date of Patent: Jul. 28, 2020

(54) METHOD AND APPARATUS FOR QUICK PROTOTYPING OF EMBEDDED PERIPHERALS

(71) Applicants: STMicroelectronics, Inc., Coppell, TX (US); STMicroelectronics Design and Application S.R.O., Prague (CZ)

(72) Inventors: Mahesh Chowdhary, San Jose, CA (US); Miroslav Batek, Blatna (CZ); Marian Louda, Prague (CZ)

(73) Assignees: STMICROELECTRONICS, INC., Coppell, TX (US); STMICROELECTRONICS DESIGN AND APPLICATION S.R.O., Prague (CZ)

( * ) Notice: Subject to any disclaimer, the term of this patent is extended or adjusted under 35 U.S.C. 154(b) by 0 days.

(21) Appl. No.: 16/281,040

(22) Filed: Feb. 20, 2019

(65) Prior Publication Data
US 2019/0272155 A1 Sep. 5, 2019

Related U.S. Application Data

(60) Provisional application No. 62/638,807, filed on Mar. 5, 2018.

(51) Int. Cl.
| | | |
|---|---|---|
| G06F 8/34 | (2018.01) | |
| G06F 8/36 | (2018.01) | |
| H04L 29/08 | (2006.01) | |

(52) U.S. Cl.
CPC ............... G06F 8/34 (2013.01); G06F 8/36 (2013.01); H04L 67/12 (2013.01); H04L 67/34 (2013.01)

(58) Field of Classification Search
CPC .......... G06F 8/34; G06F 8/36; G06F 11/3668; H04L 67/12; H04L 67/125; H04L 67/34; H04W 4/38; H04W 4/50
(Continued)

(56) References Cited

U.S. PATENT DOCUMENTS

2005/0015565 A1* 1/2005 Ryan ................... G06F 12/0292
711/202
2005/0225007 A1* 10/2005 Lai ...................... G05B 19/4099
264/308

(Continued)

OTHER PUBLICATIONS

Zehe et al., "BRIX—An Easy-to-Use Modular Sensor and Actuator Prototyping Toolkit," 2012, IEEE, p. 817-822. (Year: 2012).*

*Primary Examiner* — Qing Chen
(74) *Attorney, Agent, or Firm* — Seed IP Law Group

(57) ABSTRACT

The disclosure describes methods and apparatus for quickly prototyping of a solution developed using one or more sensing devices (e.g., sensors), functional blocks, algorithm libraries, and customized logic. The methods produce firmware executable by a processor (e.g., a microcontroller) on an embedded device such as a development board, expansion board, or the like. By performing these methods on the apparatus described, a user is able to create a function prototype without having deep knowledge of the particular sensing device or any particular programming language. Prototypes developed as described herein enable the user to rapidly test ideas and develop sensing device proofs-of-concept. The solutions produced by the methods and apparatus improve the functioning of the sensor being prototyped and the operation of the embedded device where the sensor is integrated.

20 Claims, 16 Drawing Sheets

(58) Field of Classification Search
USPC .................................................. 717/106–113
See application file for complete search history.

(56) References Cited

U.S. PATENT DOCUMENTS

| | | | |
|---|---|---|---|
| 2006/0195645 A1* | 8/2006 | Ryan | G06F 13/24 710/260 |
| 2007/0044562 A1* | 3/2007 | Sarr | G01N 29/225 73/618 |
| 2016/0023395 A1* | 1/2016 | Zhang | B33Y 30/00 264/40.6 |
| 2017/0264485 A1* | 9/2017 | Papleux | H04L 41/0806 |
| 2018/0088859 A1* | 3/2018 | Malladi | G06F 3/0655 |

\* cited by examiner

METHOD AND APPARATUS FOR QUICK PROTOTYPING OF EMBEDDED PERIPHERALS

BACKGROUND

Technical Field

The present disclosure generally relates to devices and methods that can quickly prototype sensors. More particularly, but not exclusively, the present disclosure relates to a system of computing devices that generate embedded system firmware, load the firmware, execute the firmware, collect sensor-produced data, and take action based on the collected data.

Description of the Related Art

Electronic sensors are used in many devices. Accelerometers are used, for example, in mobile computing devices, automobiles, industrial equipment, and many others. Gyroscopes, touch sensors, proximity sensors, microphones, audio devices, and many others are commonly found.

Conventional prototyping and testing of new sensors, and conventional prototyping and testing known sensors in new use cases, is a complex endeavor that requires specific configuration and use of several tools. In a substantial number of cases, the process also requires many time-consuming iterations, and each iteration requires extensive setup and control by a highly skilled software practitioner.

In the conventional prototyping processes, a specific test configuration is created by a software practitioner for a particular sensor of interest. The specific test configuration is often created specifically for the sensor and the desired test parameters. Subsequently, the configuration is loaded into a test system, and the sensor of interest in the test system is exercised according to the configuration. Data is collected during the test and expressly offloaded from the system and uploaded to a second computing system. The second computing system is generally capable of running a visualization and processing test suite such as MATLAB.

Once the collected sensor data is analyzed and understood, the software practitioner will manually change, correct, re-write, amend, or take other actions to modify the specific test configuration, and the process to generate updated sensor data is repeated.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

An embedded sensor prototype system includes software and one or more particularly programmed computing devices that enable quick prototyping of certain firmware. Embedded sensor prototype system embodiments improve the technology field of embedded sensor design and prototyping. System, device, and method embodiments (i.e., the teaching of the present disclosure) that are formed according to the principles of the present disclosure allow a software practitioner to generate sensor solutions more quickly, more efficiently, and with less cost or wasted resources.

The firmware that is prototyped by embodiments of the embedded sensor prototype system described in this disclosure initializes and operates one or more embedded sensors, collects data from these sensors, analyzes the collected data, and takes action based on the analysis. The embedded sensors, which in some embodiments are based on micro electro-mechanical systems (MEMS) technology, can operate as microphones, time-of-flight sensors, motion detection devices such as accelerators and gyroscopes, magnetometers, pressure sensors, micro-mirrors, and transducers of nearly any type.

The embedded sensor prototype system of the present disclosure is very flexible and configurable. General computing devices are transformed into specialized computing machines that cooperate using user-customizable shared algorithm libraries and predetermined templates along with and user defined data processes, which create and ecosystem that grows in functionality, capability, and efficiency each time it is used.

To enable the user-customizable features of the embedded sensor prototype system, the tool includes a graphical user interface (GUI), at least one network interface, and an embedded circuit module. The GUI provides capability for graphical design of the desired functionality using, for example, a simple drag and drop approach. The user can include predefined function blocks, which are provided in form of libraries. These predefined function blocks can be modified by the user, and there is also functionality that permits a user to optionally create custom function blocks. In some cases, the predefined function blocks have properties which can be adjusted or, in some cases, "must" be adjusted. The GUI also allows the user to interconnect the function blocks together in a very flexible architecture. The connections permit one-to-one, one-to-many, and many-to-one connections between the function blocks. Parameter of the data information, control information, or data and control information may be configurable by the user. For example, the direction of information flow, the format of the information, the timing of information, and the interdependency of information can each or all be directed by a user. Other parameters of the information can also be directed.

Compatibility checks are performed in the embedded sensor prototype system throughout the process of generating a sensing device prototype project high-level software package, which is then used to generate loadable firmware. The system checks many compatibility parameters such as the compatibility between inputs and outputs of function blocks, and the system only allows connections between terminals having the same type and dimension of information or terminals where any differences are resolvable.

The embedded sensor prototype system keeps the function blocks that are included in a project and the connections between the function blocks. These details may be stored, for example, in a local or remote memory area. In some cases, the embedded sensor prototype system sorts these details into an oriented tree, which is then used to generate high-level software code in any known software protocol (e.g., C code). By taking this approach in at least some embodiments, the conventional prototyping system are still further improved over by implementation of a program-efficient, structured set of software commands can be generated. Block and sub-blocks of such projects can also be re-used. Once generated, the high-level software code can be combined with one or more pre-prepared firmware templates and binary libraries to form a complete firmware project. This complete firmware project can be further processed (e.g., compiled, assembled, located, and the like) using particular software tools to create loadable firmware.

The loadable firmware is communicated to the embedded circuit module and executed by a processor integrated in the embedded circuit module. When the firmware is executed, one or more selected sensors will be initialized and will begin producing data. The data is collected by the embedded circuit module and processed. Raw data, processed data, results of the processing, or other information is communicated back to or otherwise within the embedded sensor prototype system. Some or all of the information, or new information representing certain results of the sensors, may be presented via the GUI and in some cases, the new information may be used selectively or automatically to modify the sensing device prototype project high-level software package.

A computer-implemented method to prototype a sensing device may be summarized as providing access to a computing system and a user interface coupled to the computing system; selecting via the user interface a plurality of function blocks, each function block formed of a library representing one or more separate and distinct modular electronic circuits; selecting via the user interface one or more communicative coupling arrangements between ones of the plurality of selected functional blocks, the communicative coupling arrangements defining one or more data communication paths; accessing a compatibility database; verifying via access to the compatibility database a compatibility between each selected communicative coupling arrangement, and based on said verifying, producing a user-defined sensing device prototype package; merging, using combinatorial logic, the user-defined sensing device prototype package with one or more pre-prepared firmware templates, each of the one or more pre-prepared firmware templates having at least one binary library associated therewith, said merging to produce a sensing device prototype project high-level software package; building the sensing device prototype project high-level software package to produce loadable firmware; loading the loadable firmware into a memory of an embedded circuit module having a sensing device that is being prototyped; and executing instructions using a processor of the embedded circuit module, and collecting digital data produced by the prototyped sensing device.

In some embodiments of the method, the sensing device is a micro-electro-mechanical (MEMS) based sensing device. The sensing device may include at least one of a microphone sensor, a time of flight sensor, or an accelerometer. In some embodiments, the library of one or more modular electronic circuits includes electronic circuit design files each having designated inputs and designated outputs that define an electronic relationship, a logical relationship, a communicative relationship, or any combination thereof between one modular electronic circuit and another modular electronic circuit.

A computer-implemented method as described herein may include creating a custom function block, by selecting an electronic circuit library and editing at least one parameter associated with at least one component of a baseline electronic circuit defined in the electronic circuit library. In some cases of the computer-implemented method described herein, merging the user-defined sensing device prototype package with the one or more pre-prepared firmware templates, includes accessing a conversion engine to retrieve parameters associated with the processor of the embedded circuit module from a selected one of the one or more pre-prepared firmware templates, retrieve initialization values from the user-defined sensing device prototype package, and direct storage of each initialization value into a respective corresponding parameter.

In some cases of computer-implemented methods described herein, the user-defined sensing device prototype package includes encoding rules arranged in a human-readable and machine-readable extensible markup language. Sometimes, the sensing device prototype project high-level software package is arranged according a C programming language.

In some embodiments, a computer-implemented method includes presenting at least one representation of the collected digital data through a second user interface. In some embodiments, the computer-implemented method includes physically moving the embedded circuit module.

A non-transitory computer-readable storage medium having stored contents to configure a computing system may perform a method. The method may be summarized as opening a design editor via a user interface of the computing system; selecting a plurality of function blocks, each function block formed of a library representing one or more separate and distinct modular electronic circuits; communicatively coupling various ones of said plurality of selected functional blocks via one or more data communication paths; automatically verifying compatibility between each selected communicative coupling arrangement; generating high level source code to implement at least portions of the plurality of selected functional blocks and at least portions of the one or more data communication paths, said generating resulting in a sensing device prototype project high-level software package; and building the sensing device prototype project high-level software package to produce loadable firmware, said loadable firmware executable by an embedded circuit module having a sensing device that is being prototyped.

In some embodiments of the method, the sensing device that is being prototyped is a micro-electro-mechanical (MEMS) based sensing device. In some embodiments, the computing system is a distributed computing system.

In some cases, a method performed as directed by the contents of a non-transitory computer-readable storage medium may further be summarized as manually selecting parameters associated with the sensing device that is being prototyped. In these or other cases, a method directed by the contents of a non-transitory computer-readable storage medium may further be summarized as loading the loadable firmware into a memory of the embedded circuit module having the sensing device that is being prototyped; executing instructions using a processor of the embedded circuit module; collecting digital data produced by the prototyped sensing device; modifying at least one parameter associated with the sensing device that is being prototyped; re-building the sensing device prototype project high-level software package to produce updated loadable firmware; loading the updated loadable firmware into the memory of the embedded circuit module having the sensing device that is being prototyped; executing updated instructions using the processor of the embedded circuit module; and collecting updated digital data produced by the prototyped sensing device. A method may be summarized further still as verifying compatible version information for each of the plurality of function blocks; and sorting the plurality of function blocks.

In still other cases, a method performed as directed by the contents of a non-transitory computer-readable storage medium may further be summarized as modifying at least one of the plurality of function blocks to create a user-defined function block; and storing the user-defined function block in a repository. In these or other cases, the method may further comprise opening the design editor via the user interface of the computing system; and selecting a second plurality of function blocks from the repository, at least of the second plurality of function blocks being the user-defined function block.

An embedded circuit module may be summarized as including a sensing device that is being prototyped; a memory; a processor arranged to execute software instructions stored in the memory; and a communication interface arranged to receive communications from a host computing system. The host computing system may be arranged to pass loadable firmware into the memory, wherein the loadable firmware was created by: selecting a plurality of function blocks, each function block formed of a library representing one or more separate and distinct modular electronic circuits; selecting one or more communicative coupling arrangements between ones of the plurality of selected functional blocks; automatically verifying compatibility between each selected communicative coupling arrangement; producing a user-defined sensing device prototype package; merging the user-defined sensing device prototype package with at least one firmware template to produce a sensing device prototype project high-level software package, wherein each firmware template has at least one binary library associated therewith; and building the sensing device prototype project high-level software package to produce the loadable firmware.

The embedded circuit module may in some cases be configurable as a pedometer, a smartphone, or an industrial controller.

Embodiments of an electronic sensing device are programmed to operate according to firmware prototyped by the computer-implemented method described herein.

Embodiments of a non-transitory computer-readable storage medium include stored contents that configure a computing system to perform the computer-implemented method described herein.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
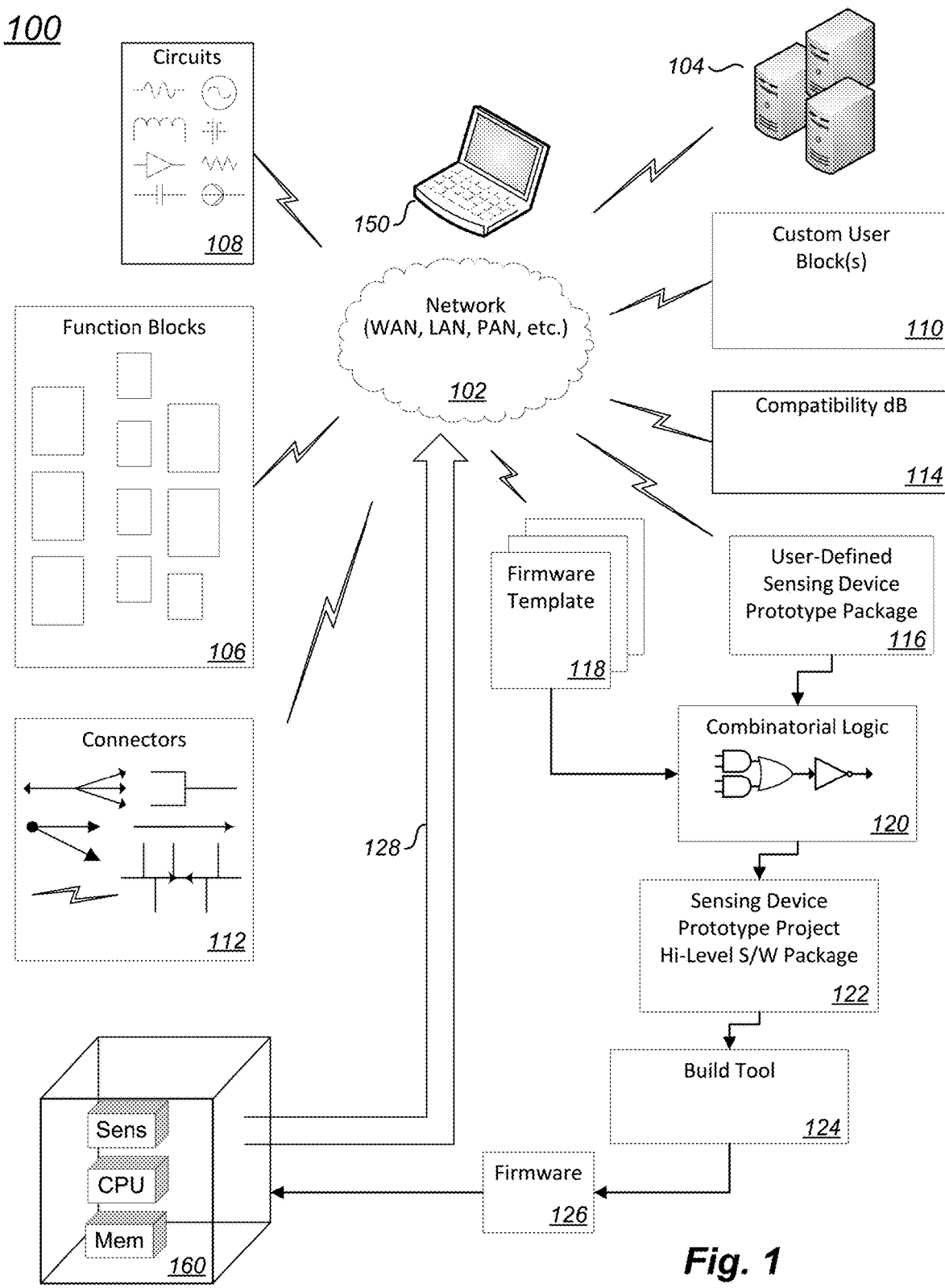
FIG. 1 is an embedded sensor prototype system.

The use of conventional tools and methodologies to test embedded sensors has led to the discovery of significant drawbacks with the conventional approach. Conventional sensor prototyping is complex, time consuming, and it requires a high level of knowledge to produce results. There is no single, streamlined approach that produces good results, and to even achieve acceptable results, the conventional approach requires many manual iterations, which is inefficient. Each prototype attempt is developed individually, piece-by-piece, and one small piece at a time. Even where templates are utilized to take advantage of previously written program code, conventional sensor prototyping techniques inefficiently demand that a software professional repeat complex, disparate tasks over and over again.

Now presented is an improvement over the conventional technology. The new embedded sensor prototype system described in the present disclosure addresses and corrects the identified flaws over the conventional approach to improve the manner in which sensors are designed and deployed. The new embedded sensor prototype system described herein creates a comprehensive system that employs software development tools in an integrated development environment (IDE) in a computing server. A software practitioner uses a graphical user interface (GUI) to select preformed function blocks and circuits, create custom function blocks and circuits, and form connections between these structures. The embedded sensor prototype system automatically performs compatibility testing and automatically combines the user-determined structures and data path connections to create a sensing device prototype project high-level software package. The embedded sensor prototype system automatically "builds" the firmware from the high-level software package and deploys the firmware to one or more embedded circuit modules. The embedded circuit modules collect data, pre-process data, and communicate collected and pre-processed information back to the computing server. The software practitioner can select how the collected and pre-processed information will be displayed, charted, tabled, or otherwise delivered. Optionally, if predetermined results are not achieved, the embedded sensor prototype system can automatically make adjustments, rebuild, and redeploy new firmware to achieve the predetermined results.

The present invention may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

The present invention may be understood more readily by reference to the following detailed description of the preferred embodiments of the invention. It is to be understood that the terminology used herein is for the purpose of describing specific embodiments only and is not intended to be limiting. It is further to be understood that unless specifically defined herein, the terminology used herein is to be given its traditional meaning as known in the relevant art.

FIG. 1 is an embedded sensor prototype system 100. With the system, a software practitioner can craft methods to quickly prototype embedded peripherals such as sensors. The embedded sensor prototype system 100 includes at least one computing device 150 and at least one embedded circuit module 160.

The computing device 150 of FIG. 1 is depicted as a laptop computer, however, it is recognized that any suitable computing system may be used. The computing device 150 includes at least one processor, at least one computer readable memory that stores software executable by the processor, at least one transceiver to communicate information to and from the computing device 150, and a user interface that is integrated with, or otherwise coupled to, the computing system. In at least some cases, a second user interface, third user interface, or any number of user interfaces are provided to design, select, edit or otherwise modify, store, transmit, collect, and set triggers on information associated with the embedded sensor prototype system 100. The computing device 150 may include many other hardware circuits, and the computing device 150 may also include software that permits use of the hardware circuits, and this logic is not depicted in FIG. 1 so as to avoid unnecessarily obscuring the inventive concepts.

The embedded circuit module 160 is a computing device having at least one sensor, at least one processor, and at least one memory. One or more sensing devices of the embedded circuit module are included with, and prototyped by, the embedded sensor prototype system 100. In some embodiments, the embedded circuit module 160 may be arranged as a test platform, development board, expansion board, or some other such system expressly used to develop software, expressly used to test hardware, and, in the alternative or in addition, expressly used to perform other functions. In other embodiments, the embedded circuit module 160 is a specific device such as a pedometer, a smartphone, an industrial controller, or any other type of computing device.

The sensing device or devices of an embedded circuit module 160 may be any type of sensing device arranged as a computing peripheral. A non-exhaustive, non-limiting list of such sensing devices includes motion detection devices such as microphones, time-of-flight sensors, accelerators and gyroscopes, magnetometers, pressure sensors, actuators, micro-mirrors, and transducers of nearly any type These sensors can be used in any way to detect, enable, or otherwise convert energy associated with automation, measurement, control, detection, or the like. The sensors can be particularly arranged to interact with any one more physical properties of the world (e.g., electromagnetic energy, force, torque, light, sound, motion, pressure, rotation, molecular composition (e.g., chemicals), temperature, radiation, and the like). Various embodiments of sensors contemplated by the inventors are based on micro electro-mechanical systems (MEMS) technology, but the sensors can be based on any other suitable and desirable technology too.

The computing device 150 and the embedded circuit module 160 uni-directionally or bi-directionally communicate information via a network 102. In some cases, one or both of the computing device 150 and the embedded circuit module 160 communicate with a remote computing system 104, which may be, for example, a "cloud" computing system accessible via the Internet, a server farm, or some other distributed computing system. In this way, some or all of the functions described herein described with respect to computing device 150 may be interchangeably performed by the remote computing system 104. In this way, for example, an embedded sensor prototype system 100 may concurrently prototype sensing devices in one, two, ten, fifty, or hundreds, or any other number of embedded circuit modules 160.

Other modules in the embedded sensor prototype system 100 of FIG. 1 include a function block repository 106, a circuit library repository 108, a custom user block generator 110, and a connectors repository 112.

The functional block repository 106 is arranged as a plurality of libraries. Using a sensor prototype development environment delivered via the user interface of the computing device 150, the software practitioner is presented with a graphical user interface (GUI). The GUI permits the software practitioner to select any number of the function blocks from the functional block repository 106. A non-exhaustive, non-limiting list of function blocks is presented in Table 1.

TABLE 1

Function Blocks

| Functional Unit | Configuration & Properties |
| --- | --- |
| Buffers | Function Blocks for Operations With Data Buffers |
| Comparison | Input/Output |
| Constants | Values |
| Display | Interface |
| Graphics | Interface |
| Logic Operation | Input/Output/Boolean Operation |
| Math Operation | Input/Output/Formula |
| MotionAC | Accelerometer Calibration Parameters |
| MotionAR | Activity Recognition Parameters |
| MotionAW | Activity Recognition for Wrist Parameters |
| MotionCP | Carrying Position Parameters |
| MotionEC | eCompass Parameters |
| MotionFA | Fitness Activities Parameters |
| MotionFD | Fall Detection Parameters |
| MotionFX | Sensor Fusion Parameters |
| MotionGC | Gyroscope Calibration Parameters |
| MotionGR | Gesture Recognition Parameters |
| MotionID | Intensity Detection Parameters |
| MotionMC | Magnetometer Calibration Parameters |
| MotionPE | Pose Estimation Parameters |
| MotionPM | Pedometer Parameters |
| MotionPW | Motion Parameters |
| MotionSD | Standing and Sitting Desk Detection Parameters |
| MotionTL | Tilt Sensing Parameters |
| Other | Function Block Specific Parameters |
| Sensor Hub | Input/Output/Sensor Type/Sensor Parameters |
| Sequential Logic | Function Block for sequential logic (flip flops) |
| Signal | Signal Parameters |
| User Input | User Input Parameters |
| Vector Operations | Vector Parameters |

Once selected, one or more libraries associated with the selected function block are imported into the working project space of the embedded sensor prototype system 100. The libraries may be fully or partially contained in the function block repository 106. In some cases, one or more associated libraries from the circuit library repository 108 may also be included. In this way, the software practitioner selects via the user interface function blocks formed of a library representing one or more separate and distinct modular electronic circuits.

The GUI also permits the software practitioner to select the particular parameters associated with any number of the selected function blocks. In one non-limiting embodiment, described herein to express principles that may be followed for each of the function blocks, the software practitioner selects a Sensor Hub function block. The selection may be by drag-and-drop, cut-and-paste, or by some other technique for example.

Selection of the Sensor Hub function block invokes automatic action to prompt the software practitioner for definition of particular configuration and properties of the selected function. The code library associated with the Sensor Hub function block provides links to selectable sensors and algorithms that can be executed on the in embedded circuit module 160 in order to retrieve data from the selected sensors. If the software practitioner selects an accelerometer and a gyroscope, for example, the software practitioner will be prompted to enter certain properties for the sensors. For example, the software practitioner may be prompted to enter, select, or otherwise define a data rate that defines the sensor's and algorithm's data rate in Hz; the software practitioner may also be prompted to enter, select, or otherwise define the sensor's range, full scale, and other parameters.

The custom user block generator 110 may be invoked when a software practitioner "drags" or otherwise utilizes the user interface to include a User Input function block into a particular project of the embedded sensor prototype system 100. The custom user block generator 110 may be invoked in other ways. The custom user block generator 110 permits a software practitioner to define any type of custom sensor, custom sensor algorithm, custom test parameters, and the like. The software practitioner may include predetermined libraries, or the software practitioner may include generic, customizable libraries.

As the software practitioner includes two or more function blocks (e.g., predefined function blocks from the function block repository 106, customized function blocks from the custom user block generator 110, and the like), the software practitioner can also select various connection means from the connectors repository 112 to couple the function blocks together. Libraries (e.g., binary software, rules files, scripting language, or the like) of one form or another are invoked to couple the function blocks according to connection parameters that are either predefined or defined by the software practitioner. The parameters may include data rates, data formats, data size, flow control, and the like. In this way, the software practitioner selects via the user interface one or more communicative coupling arrangements between ones of the plurality of selected function blocks that define one or more data communication paths between the associated function blocks.

While selecting function blocks, or after selecting function blocks, the embedded sensor prototype system 100 will access and draw information from a compatibility database 114. The compatibility database 114 performs checks to verify whether or not the function blocks and connections selected, defined, and otherwise arranged by the software practitioner are compatible. The checks performed via information from the compatibility database 114 may cover data rates, input data format, output data format, power consumption, and the like. Cooperative with the function block selection, connections selection, and compatibility features, the embedded sensor prototype system 100 will produce a user-defined sensing device prototype package 116. The user-defined sensing device prototype package 116 may be arranged in an extensible markup language, a different text-based language, a proprietary format, or any other suitable means. The user-defined sensing device prototype package 116 may or may not be human-readable.

One or more firmware templates 118 are merged with the generated user-defined sensing device prototype package 116 by a combinatorial logic module 120. The firmware templates 118 may be selectable from a plurality of firmware templates 118. Each firmware template 118 has predefined therein any one or more of parameters, libraries (e.g., binary libraries), object code, definitions, and the like that characterize all or part of the embedded circuit module 160. For example, in some cases, the firmware template 118 includes a board support package (BSP), hardware abstraction layer (HAL) drivers, low and high level sensor drivers, user interface drivers, high-level software applications, communications programs, and the like.

The output from the combinatorial logic module 120 includes software that operates the embedded circuit module 160, and high-level software that directs the operations of the one or more sensing devices being prototyped. The output from the combinatorial logic module 120 is a sensing device prototype project high-level software package. The output may include one or more files having high-level language (e.g., C code, C++ code, or the like) programs, parameter files, object code, build scripts, load scripts, and the like.

Load scripts, if such data is generated, can be used to direct the importation, checking, and loading of updated firmware into the embedded circuit module 160. In some embodiments, for example, the load scripts can direct the embedded circuit module 160 to reload its entire firmware, or the load scripts can direct the embedded circuit module 160 to only load new or updated firmware associated with a sensing device being prototyped. In this way, the efficiency of iteratively modifying and testing new prototypes is even further improved.

The sensing device prototype project high-level software package is further processed by build tools 124 to produce loadable firmware 126. The building processing may include compiling, assembling, locating, and the like. The loadable firmware includes software instructions executable by a processor of the embedded circuit module 160.

The loadable firmware 126 is then communicated to the embedded circuit module 160 via a suitable communication interface (e.g., universal serial bus (USB), Ethernet, IEEE 802.11, or some other interface and cooperative communication medium). The communication may be via a wired medium, wireless medium, or any other medium and by any suitable protocol. In some cases, load scripts cooperate with a loader in the embedded circuit module 160 to desirably load the loadable firmware 126 into a memory of the embedded circuit module 160.

When a process of the embedded circuit module 160 executes the instructions of the loadable firmware 126, the prototyped sensing device may begin to produce data. The data produced may be analog data, digital data, or some other form of data. For purposes of the present disclosure, because the data is collected via the embedded circuit module 160, the data collected is referred to as digital data produced by the prototyped sensing device.

In some cases, the processor of the embedded circuit module 160 is directed to process, pre-process, or otherwise format some or all of the collected digital data produced by the prototyped sensing device. This processing may or may not include testing so as to generate particular results associated with the prototyped sensing device. The sensing device information 128 derived from the collected digital data, which may also include data generated by the processor of the embedded circuit module 160, is communicated back to the computing device 150.

The computing device 150 receives the sensing device information 128 from the embedded circuit module 160. The computing device 150 may process the received sensing device information 128 in any desirable way, and deliver results via the user interface. The results may include charts, tables, graphs, visualizations, or any other such delivery. The results permit the software practitioner to know when parameters of the sensing device being prototyped are acceptably defined. In this way, because the operations of the sensing device being prototyped have been acceptably optimized for the desired purpose, the operation of the embedded circuit module 160 itself is improved.

In some cases, the sensing device information 128 communicated from the embedded circuit module 160 is manually studied, interpreted, or otherwise analyzed by the software practitioner or another skilled party. The parameters that are set, defined, or otherwise established in order to produce the loadable firmware 126 are manually modified, and new or updated loadable firmware 126 is produced and tested. In other cases, the analysis and updating of parameters is automatic. For example, parameters of an accelerometer may be automatically adjusted based on a calibration procedure for the specific sensing device (i.e., accelerometer) integrated with the embedded circuit module 160. Various expected results from testing the prototyped accelerometer are expected, and if not achieved, the embedded sensor prototype system 100 can be configured to automatically adjust parameters, produce new loadable firmware 126, and automatically load and re-test the prototyped accelerometer. When the sensing device information 128 is determined to be acceptable, the parameters may be saved, and the calibration will end.

Figure 2:
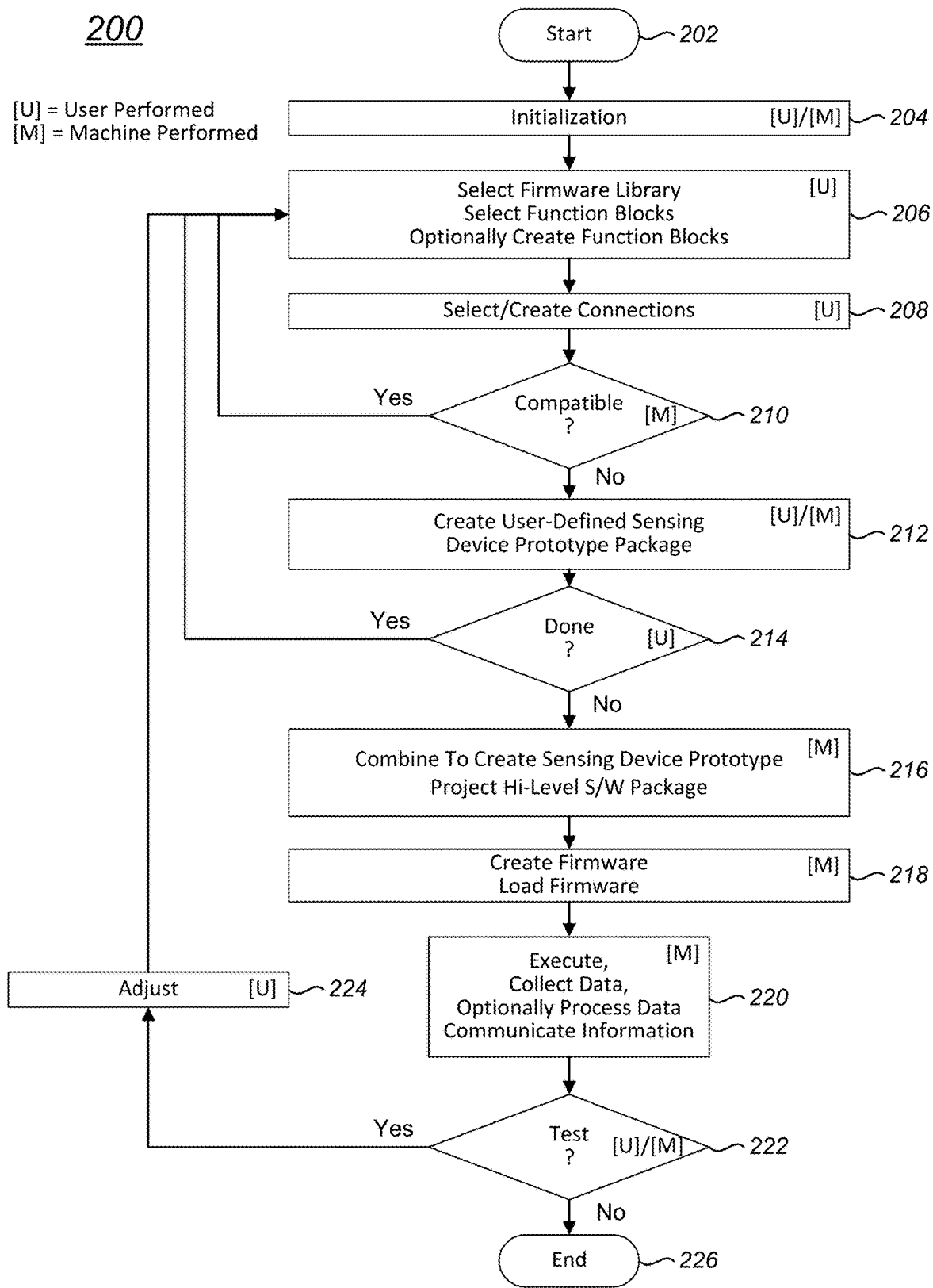
FIG. 2 is an exemplary data flow diagram of a method to prototype an embedded peripheral.

FIG. 2 is an exemplary data flow diagram of a method to prototype an embedded peripheral 200. The embedded peripheral may be a sensing device (i.e., a sensor) of the type described in the present disclosure. In some cases, the method to prototype an embedded peripheral 200 allows a software practitioner to perform quick firmware prototyping of a solution using sensors. Predefined function blocks, user defined function blocks, or both, are included in a project to build loadable firmware prototypes for the sensor under analysis. The build process can include predefined libraries (e.g., binary libraries, object files, parameter files, scripts, electronic circuit design files, and the like), user-defined logic, and the like. The method produces loadable firmware from user defined data processing, pre-existing algorithms, and other sources.

Via a user interface, the method in some cases will invoke a graphical design editor that lets a software practitioner drag-and-drop, cut-and-paste, or take other actions to create or include the desired functionality. Some function blocks have properties which can or must be adjusted by the software practitioner. After selecting desired function blocks, the software practitioner can interconnect the function blocks together. The method can check the compatibility between inputs and outputs, allow connections only to terminals with the same type and dimension, and verify other cooperative characteristics of the function blocks. The method can also generate software (e.g., C code, C++ code, or the like) that is later used to produce loadable firmware.

In the method to prototype an embedded peripheral 200, various acts are designated with "[U]", "[M]", or "[U]/M" to indicate the source of particular processing in the respective processing module. The designation of "[U]" indicates that a user (i.e., a software practitioner) is performing the substantive actions associated with the reference module in FIG. 2, though some processing may of course be performed by the underlying computing device. The designation of "[M]" indicates that the machine (i.e., a computing device of the embedded sensor prototype system 100, such as one or both of the underlying computing device 150 and embedded circuit module 160) is performing the substantive actions in the processing module, though some processing may of course be performed by the software practitioner. The designation of "[U]/[M]" indicates that both the machine and the user are performing the substantive actions.

Processing begins at 202 in the exemplary data flow diagram of a method to prototype an embedded peripheral 200 of FIG. 2.

At 204 the embedded sensor prototype system 100 is initialized. The computing device opens a prototype development environment. A software practitioner may interact with the prototype development environment via graphical user interface (GUI). During initialization, the software practitioner may select navigation paths to various resources, fonts, screen resolution, display windows, and other aspects of the prototype development environment. The software practitioner may set the project name, select a project location (e.g., a directory where the loadable embedded circuit module firmware 126 will be placed, and select build tools 124 (e.g., a toolchain), which will be used for building the loadable embedded circuit module firmware 126. The software practitioner may also select a target embedded circuit module 160. The underlying computing device of the embedded sensor prototype system 100 will allocate memory, pre-load default parameters, form particular network communication paths with databases and the like, and perform other computer-based initialization actions. Other parameters and initialization may of course also be performed.

Processing falls to 206 where a firmware library is selected, function blocks are selected, and optionally, function blocks are created by the software practitioner. An intuitive interface of the prototype development environment may permit the software practitioner to easily see available function blocks, include or exclude function blocks, set parameters, and the like. The software practitioner may optionally select the function blocks from the function block repository 106, the circuit library repository 108, or some other source. In some cases, the software practitioner may select function blocks, which automatically includes one or more properly associated "circuits" from the circuit library repository 108. In other cases, the software practitioner may directly select "circuits" from the circuit library repository 108.

The circuit library repository 108 may be arranged as a library of one or more modular electronic circuits that includes electronic circuit design files. Each electronic circuit design file has one or both of designated inputs and designated outputs that define an electronic relationship, a logical relationship, a communicative relationship, or any combination thereof, between one modular electronic circuit and another modular electronic circuit. In some cases, circuits are separate and distinct from each other. In some cases, two or more circuits are grouped together as modular electronic circuits in a common cluster to perform one or more specific electronic functions. Non-limiting examples of such circuits include filter circuits, power circuits, amplifier circuits, current-limiting circuits, clock circuits, clock-matching circuits, buffer circuits, and modulation circuits. Many other types of circuits are of course contemplated.

The software practitioner may optionally create one or more function blocks. Creation of a user-defined function block may include selecting an electronic circuit library, editing at least one parameter associated with at least one component of a baseline electronic circuit defined in the electronic circuit library, defining parameters associated with the user-defined function block, and performing other such tasks. A software practitioner may, for example, select a MEMs based circuit as a baseline electronic circuit such as an accelerometer. The software practitioner may choose parameters to adjust a number of axes, sensitivity, source signaling, sense timing, range, and many other such parameters. As another example, a software practitioner may choose an electronic low-pass filter as a baseline circuit. The software practitioner may select or otherwise adjust cutoff frequency, sampling rate, input signal levels, and the like.

After the software practitioner includes, creates, or otherwise selects the desired function blocks, processing falls to 208 where connections between function blocks are defined. Processing then advances to 210.

At 210, the compatibility of the function blocks, the parameters defined for the function blocks, and the communicative couplings between the function blocks are verified. The verification process is automatic. The verification may be performed concurrent or otherwise proximate to accessing a compatibility database 114. If compatibility is not verified successfully, processing returns to 206. The software practitioner can make changes to function blocks, parameters, connections, or any other aspects of the projects. Alternatively, if compatibility is verified, processing continues to 212.

At 212, the user-defined sensing device prototype package 116 is generated. This package may include encoding rules arranged in a human-readable and machine-readable extensible markup language. The package may include more or less other information. In this processing, the underlying computing device will operate automatically in accordance with parameters directed by the software practitioner. File sizes, locations, tool sets, bibliographic data, device identification data, encoding, and other parameters may be selected by the software practitioner.

At 214, if the software practitioner has completed the process of adding and formatting parameters of the function blocks and connections, processing falls to 216. Else, processing returns to 206.

At 216, the method includes merging the user-defined sensing device prototype package with the one or more pre-prepared firmware templates by accessing, for example, a conversion engine of combinatorial logic 120.

In some cases, the conversion engine maintains the included function blocks and connections in memory and sorts them into an oriented tree. This oriented tree may be used by the computing system during generation of a high-level software program. This "tree" approach permits a more efficient generation of software command flow. To carry out these or other processes, the conversion engine may be arranged to retrieve parameters associated with the processor of the embedded circuit module from a selected one of the one or more pre-prepared firmware templates. The conversion engine may further be arranged to retrieve initialization values from the user-defined sensing device prototype package and direct storage of each initialization value into a respective corresponding parameter. The conversion engine in this case is arranged to generate a sensing device prototype project high-level software package 122. This package may be arranged, in whole or in part, according a C programming language, a processor assembly language, or some other language.

At 218, a set of build tools 124 act on the sensing device prototype project high-level software package 122 to produce the embedded circuit module firmware 126. In at least some cases, the build tools 124 may access, include, or otherwise work in cooperation with one or more firmware templates 118 to merge the respective template into a user-defined sensing device prototype package 116 using combinatorial logic module 120. The embedded circuit module firmware 126 is loaded into the embedded circuit module 160.

Processing falls to 220, where the embedded circuit module 160 executes the embedded circuit module firmware 126. In some cases, the prototyped one or more sensors automatically produce data that is collected by the embedded circuit module 160. In some cases, the prototyped one or more sensors are exercised or otherwise tested in order to produce useful data. In at least one case, the embedded circuit module 160 is physically moved. In this case, where the prototyped one or more sensors include accelerometers, gyroscopes, or other motion-sensitive sensors, moving the embedded circuit module 160 helps generate useful data.

In some cases, a processor of the embedded circuit module 160 performs one or more algorithms to process the collected data. The algorithms may pre-process the collected data, process the collected data, format the collected data, or perform other actions. For example, the algorithm executed by the processor of the embedded circuit module 160 may normalize collected data, range-test collected data, exclude certain collected data, or perform other actions.

After data is collected, the sensing device information 128 is communicated back to the computing device 150. The computing device 150 may perform certain acts on the collected information. The software practitioner may determine how the collected information is presented (e.g., charts, logical analyzer, text values, graphs, or the like).

At 222, the results of the collected information may be tested. The testing may be manual or automatic. If further prototyping is necessary, one or more values may be adjusted at 224, and processing returns to 206. The adjustments at 224, 206, or 224 and 206 may be manual (e.g., by the software practitioner), or the adjustments may be automatic. Alternatively, if testing at 222 is successful or otherwise completed, processing falls to 226.

In some cases, an electronic sensing device is programmed to operate according to firmware prototyped by the method to prototype an embedded peripheral 200.

Processing ends at 226.

Figure 3:
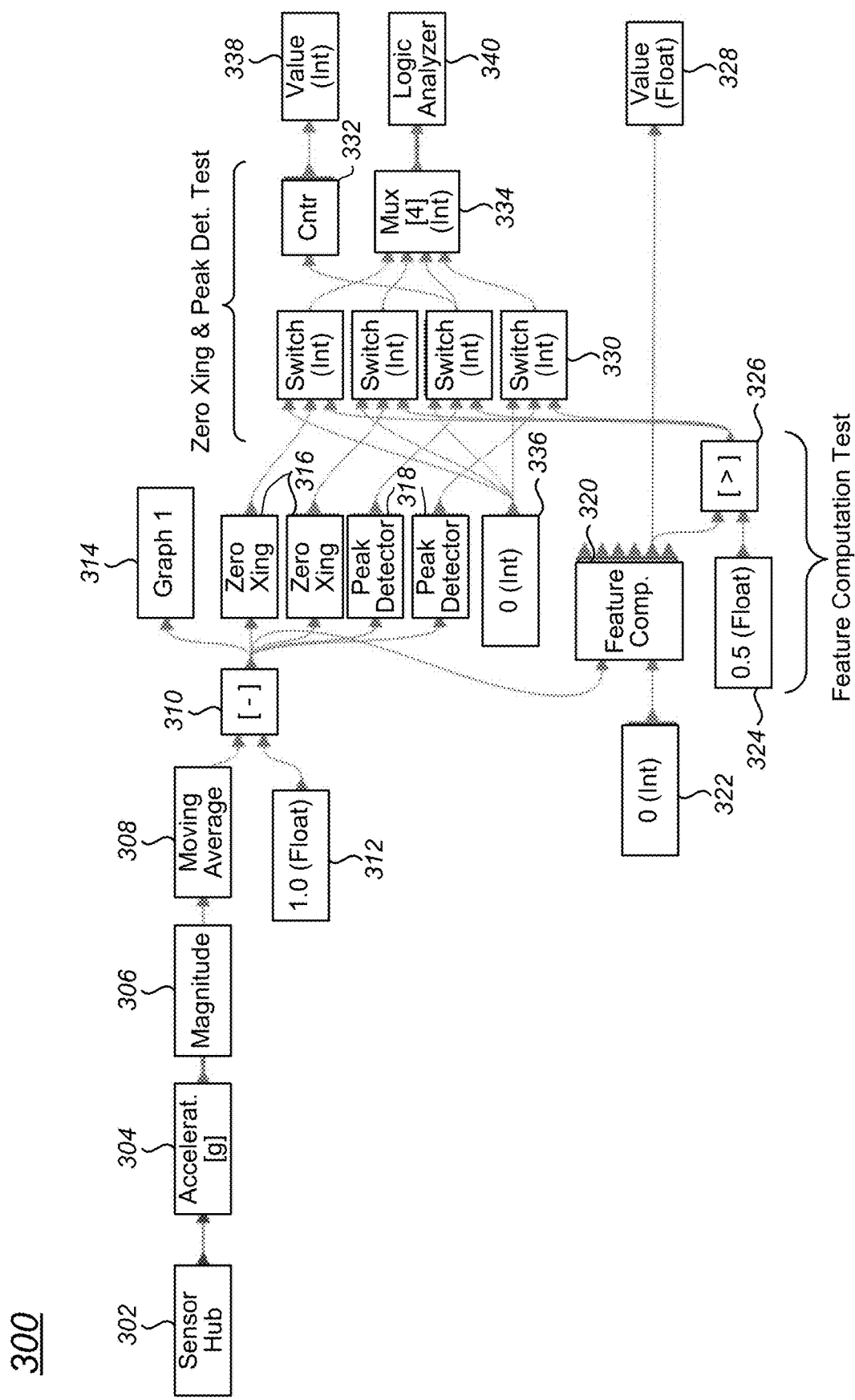
FIG. 3 is an exemplary window of a prototype development environment.

FIG. 3 is an exemplary window of a prototype development environment 300. The exemplary window represents acts of the method of FIG. 2 and other features described in the present disclosure. In particular the sensing device being prototyped in FIG. 3 is an accelerometer.

The project begins when a software practitioner is provided with access to a computing system having a particular software design package. The software practitioner may, via a design editor presented on a user interface, draw an accelerometer sensor 304 into the prototype development environment 300 from a sensor hub library 302. Other sensors (e.g., gyroscopes, magnetometers, pressure sensors, humidity sensors, temperature sensors, etc.), which may be MEMS sensors or some other type of sensor architecture, could also have been selected. In at least some cases, an exemplary accelerometer is modeled after an LSM6DSM INERTIAL MEASUREMENT UNIT by STMICROELECTRONICS, which is arranged as a tri-axial accelerometer and gyroscope in a common integrated circuit package. The software practitioner may select various parameters associated with the accelerometer 302 such as full scale range (e.g., 2G, 4G, 8G, 16G), output data rate (e.g., 13 Hz, 26 Hz, 52 Hz, 104 Hz, 208 Hz, 416 Hz, 832 Hz, 1665 Hz, 3330 Hz, 6660 Hz), and the like. The software practitioner may also select one or more communicative coupling arrangements for the selected accelerometer and any other function blocks added by the software practitioner to the prototype design of the embedded sensor.

A magnitude object 306 may be used to capture full scale accelerometer values, set thresholds, baseline values, offsets, constants, and the like, and a moving average object 308 may be used to direct the prototyped sensor to accumulate and generate one or more moving average values. When the device is in actual or simulated operation, the raw acceleration values from one or more axes, raw rotational data from a gyroscope, or any combination thereof may be arranged for accumulation and computational analysis. The computational analysis may produce an average and any other statistical output as directed by a software practitioner.

The moving average object 308 will provide accelerometer output data to a mathematical operator object 310. In the prototype development environment 300 of FIG. 3, the mathematical operator object 310 is a subtraction module, but any other mathematical operators (e.g., sum, div., mult., AbsVal., TrigFn( ), Sqr., SqrRt., DecToRad, RadToDec, or the like) could have been selected by the software practitioner. Also provided to the mathematical operator object 310 is a display function 312. The first display function may be directed by the software practitioner to normalize output data from the accelerometer 304. In this embodiment, the output data will be normalized to a stream of floating point values dimensioned as directed by the software practitioner. Other data types (e.g., integer, variant) could have also been selected.

The stream of normalized accelerometer data emanating from the mathematical operator object 310 is distributed in any way as selected by the software practitioner. In the embodiment of FIG. 3, six outputs are selected and included in the sensor prototype including, a graph object 314, two zero crossing objects 316, two peak detector objects 318, and a feature computation test object 320.

The graph object 314 is arranged to produce on an output display and graphical representation of the streaming accelerometer data. The software practitioner may select a number of curves, graph and waveform names, units, zero axis position, auto-scaling, manual scaling, full scale value, colors, granularity, and other functionality. The zero crossing objects 316 and peak detector objects 318 may be arranged by the software practitioner to identify operational characteristics of interest for the accelerometer 304. In the embodiment of FIG. 3, the software practitioner may select which directional axis will be monitored, whether gyroscopic (e.g., gravitational) data will be monitored, and the like. In this way, the prototyped sensor, when in operation, may be tested or otherwise validated in three-dimensional space, during drop tests, rotation tests, and any other tests selected by the software practitioner.

The feature computation test object 320 is supported by two display value functions 322, 324, and a mathematical operator object 326. The output of feature computation test cluster is passed to yet another display value function 328. In the embodiment of FIG. 3, the feature computation test cluster is arranged to accept streaming data from the accelerometer into the feature computation test object 320 and to accept a control integer from display value function 322. While in the present case, the feature computation test object 320 is only arranged to accept input from the accelerometer, one of skill in the art will recognized that more complex designs may pass data from other objects into the feature computation test object 320. In these cases, the control integer from display value function 322 will determine which data is acted on in the feature computation test cluster. The output from the feature computation test object 320 is compared to a floating point display value function 324 selected by the software practitioner via a mathematical operator object 326. In the embodiment of FIG. 3, the mathematical operator object 326 is a "greater-than" operator, but any other operator could have been selected. The output of the mathematical operator object 326 is passed as an input into a zero-crossing and peak detection test cluster.

The zero-crossing and peak detection test cluster includes a plurality of switch objects 330, a counter object 332, and a multiplex object 334. A display value function 336 is also input to the zero-crossing and peak detection test cluster as well as data values from the zero crossing objects 316 and the peak detector objects 318. As evident in the embodiment of FIG. 3, a software practitioner has the design freedom to craft any particular test that is desired. Here, an output from one particular switch object 330 is accumulated in a counter object 336, and the value from the counter object 336 is passed to an integer display value function 338. The counter object 336 may be arranged by the software practitioner to count peaks, zero crossings, results from the feature computation test cluster, or any other events.

In the embodiment of FIG. 3, streaming output data will be displayed to the software practitioner via a same user interface, a second user interface, or any number of configured user interfaces. In addition, the software practitioner in the embodiment of FIG. 3 has selected a logic analyzer object 340 for presentation on an output display. The logic analyzer in FIG. 3 can take input signals for analysis from any of the earlier modules as shown, but in other embodiments, a software practitioner can make any other selections from the display library (e.g., bar graphs, 3D teapot models, graphs, histograms, 3D plots, scatter plots, text, and the like).

Figure 4A:
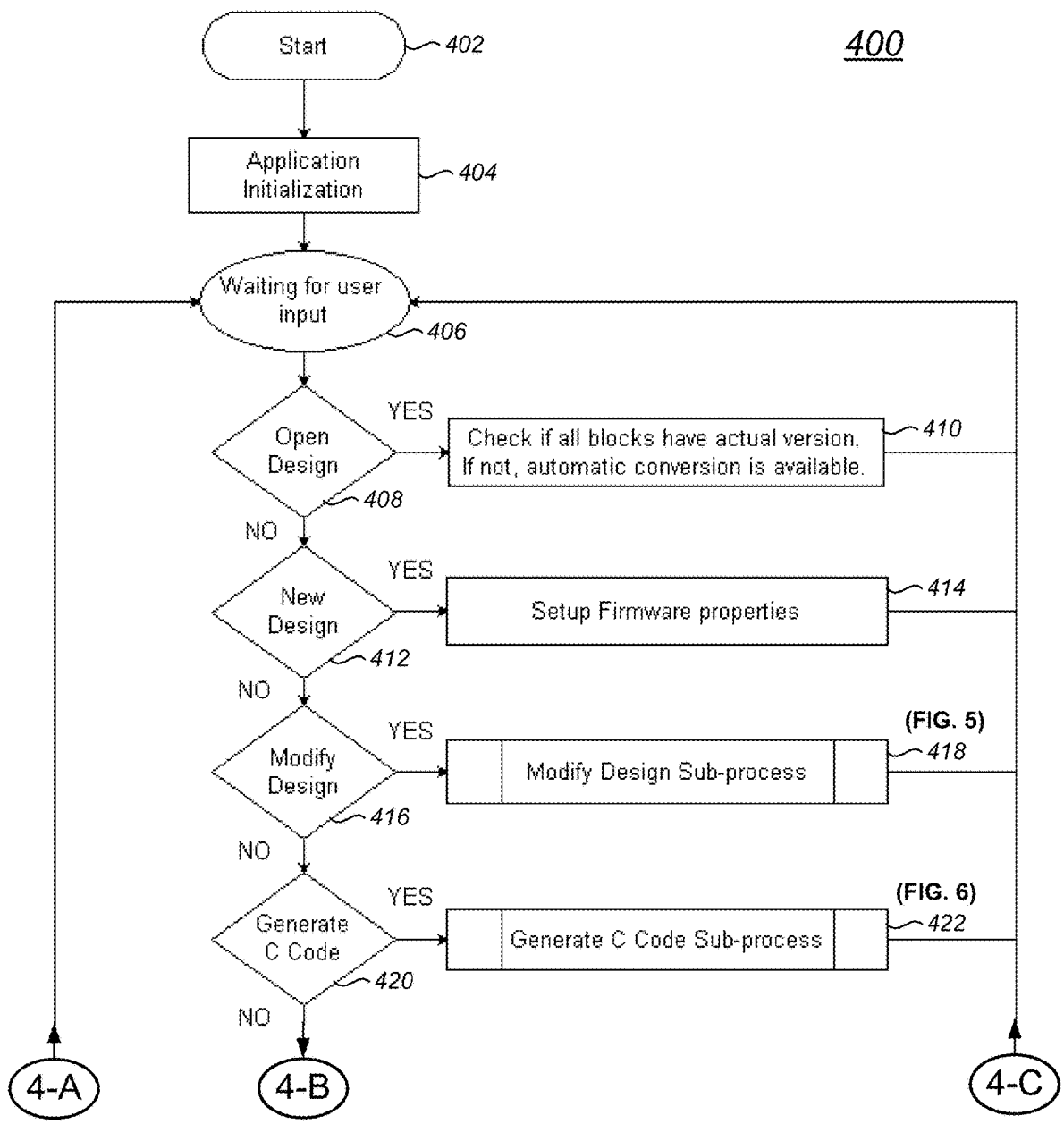
FIGS. 4A and 4B are another exemplary data flow diagram of a method to prototype an embedded peripheral.
Figure 4B:
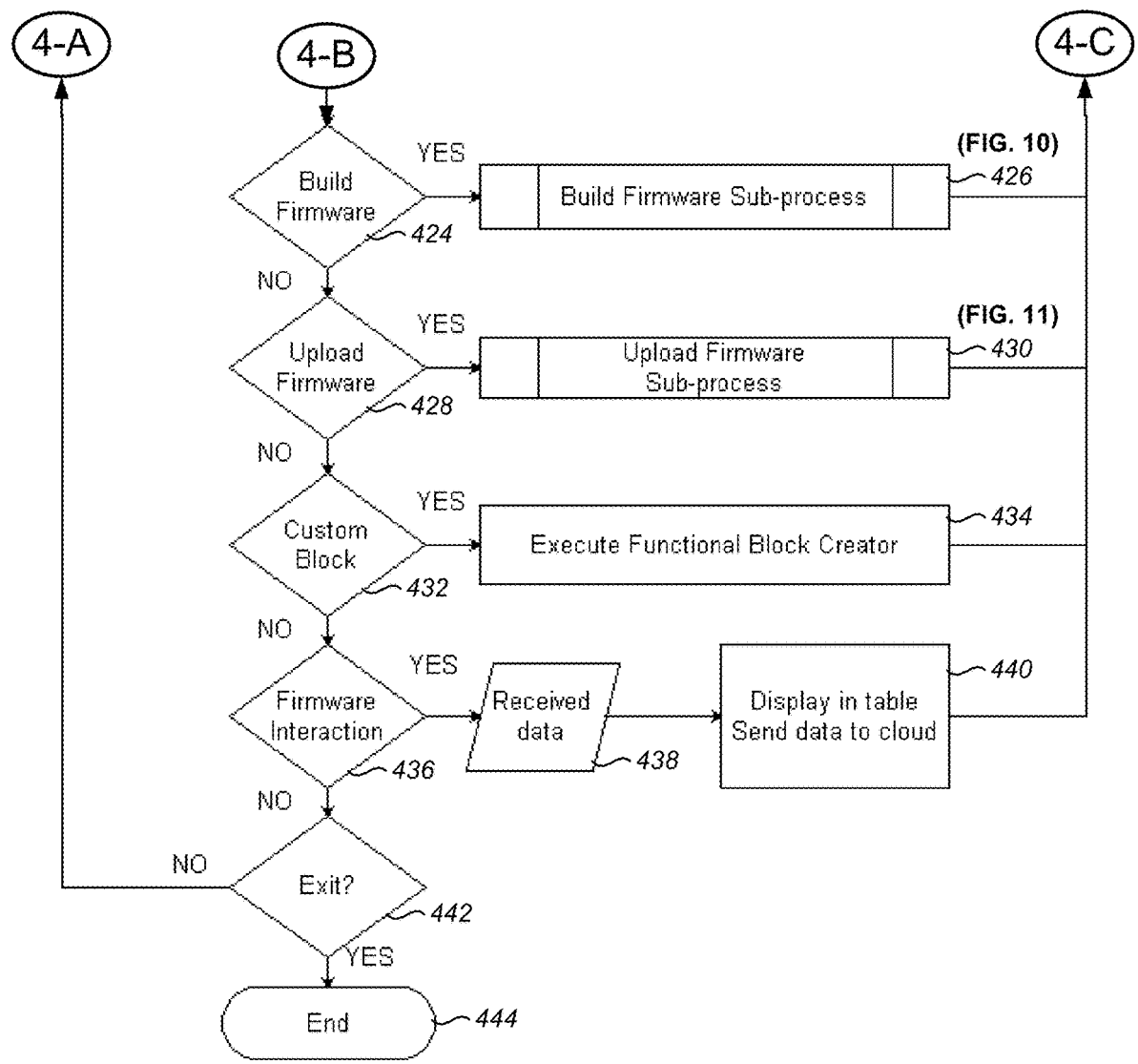

FIGS. 4A and 4B are another exemplary data flow diagram of a method to prototype an embedded peripheral 400. One of skill in the art will recognize similarities and distinctions between the present embodiment and the exemplary data flow embodiment to prototype an embedded peripheral 200 of FIG. 2. To avoid confusion, one or both of FIGS. 4A and 4B may be referred to as FIG. 4. It is noted that in FIG. 4, and in others of FIGS. 5-11, that various processing in one module is further detailed in a subsequent figure. For this reason, the processing in each figure is described in full before a discussion of the processing in later, more detailed figures. The order of discussion in the present disclosure does not limit the order of processing in the method to prototype an embedded peripheral 400 unless such an order is expressly disclosed.

Processing in the embodiment of FIG. 4 begins at 402, and the system is initialized at 404. Initialization may be along the lines of initialization at 204 in FIG. 2. One of skill in the art will recognize that embodiments of devices, systems, and methods disclosed with respect to FIG. 1 are implemented in the operations of the method to prototype an embedded peripheral 400, even when, for simplicity, such devices, systems, and methods are not called out in the discussion of FIGS. 4-11.

At 406, the computing system will wait for software practitioner input. The system may display a development environment to software practitioner inviting the customization of a particular prototype embodiment. The customization may include selection of one or more libraries, selection of one or more function blocks, creation of function blocks, creation of test protocols, setting initial or interim parameter values, changing existing embodiments, generating reports, or taking any other action. As evident in FIG. 4, the processing of the method to prototype an embedded peripheral 400 may be ongoing. Along these lines, each set of sub-processing that is performed in the method may return to processing at 406, which includes waiting for software practitioner input. In the embodiment, it is confirmed that some processing in at least some of the modules may be ongoing (e.g., streaming data, collecting data, performing calculations, and the like) while processing at 406 waits for input from a software practitioner.

At 408, the computing system will have accepted input from the software practitioner. If the input information indicates that a software practitioner desires to open a preexisting embedded peripheral prototype, then processing advances to 410. Processing at 410 includes retrieval from memory at any location a set of data that informs the computing system of a previous prototype design. Version numbers for any number of files may be checked, and if "outdated," then the retrieved files may be automatically converted. Validation by version number is performed, in at least some cases, to maintain compatibility as new modules are added, as existing modules are modified, and for other reasons. Such validation may, for example, cooperate with a compatibility database 114 (FIG. 1). After processing at 410, processing will return to 406. Alternatively, processing and the software practitioner input will fall to 412.

At 412, the computing system will have accepted input from the software practitioner. If the input information indicates that a software practitioner desires to create a new embedded peripheral prototype, then processing advances to 414. At 414, processing is performed to setup firmware properties associated with embedded peripheral prototype. Processing at 414 may be along the lines of processing at 206-210 of FIG. 2.

Considering one exemplary and non-limiting embodiment of use with respect to 414, a software practitioner has a desire to modify a sensing device prototype project by forming a user-defined function block. The user-defined function block, once created (e.g., a user-defined sensing device prototype package 116), will be stored in a repository such as the function block repository 106. Earlier, the software practitioner has configured a computer system with relevant design tools as described herein and generated the sensing device prototype project. The project includes a plurality of function blocks representing one or more separate and distinct modular electronic circuits and communicatively coupled various ones of said plurality of selected functional blocks via one or more data communication paths. High-level source code to implement at least some portions of the plurality of selected functional blocks and at least some portions of the one or more data communication paths has been generated, which created a sensing device prototype project high-level software package. The software practitioner has also performed a build process on the sensing device prototype project high-level software package and produced loadable firmware, which may or may not have been loaded via a suitable communication interface into a memory of an embedded circuit module. At this point, whether or not data has been produced by the sensing device that is being prototyped, the software practitioner has a desire to create a user-defined function block.

The user may, for example via a design editor arranged to operate as or with a custom user block generator 110, bring an existing function block into the sensing device prototype project. The existing function block may or may not be an earlier created user-defined function block. In either case, the function block to modify is any one of a plurality of existing function blocks that the software practitioner may choose from a repository (e.g., function block repository 106, circuit library repository 108, or the like). Once brought into the project, the software practitioner may modify inputs, outputs, one or more communication paths or communicative coupling arrangements, any number of other parameters, high-level software instructions, or some other characteristic of the function block. Once modified, the user-defined function block that was created is used in the current project and if so desired by the software practitioner, the user-defined function block is also stored in a suitable repository.

After processing at 414, processing will return to 406. Alternatively, processing and the software practitioner input will fall to 416.

At 416, the computing system will have accepted input from the software practitioner. If the input information indicates that a software practitioner desires to modify an embedded peripheral prototype design, then processing advances to 418. Processing at 418 is described in more detail in with respect to FIG. 5. After processing at 418, processing will return to 406. Alternatively, processing and the software practitioner input will fall to 420.

At 420, the computing system will have accepted input from the software practitioner. If the input information indicates that a software practitioner desires to generate high-level software code, then processing advances to 422. Processing at 422 is described in more detail with respect to FIG. 6. After processing at 422, processing will return to 406. Alternatively, processing and the software practitioner input will fall to 424.

At 424, the computing system will have accepted input from the software practitioner. If the input information indicates that a software practitioner desires to build the executable firmware, then processing advances to 426. Processing at 426 is described in more detail with respect to FIG. 10. After processing at 426, processing will return to 406. Alternatively, processing and the software practitioner input will fall to 428.

At 428, the computing system will have accepted input from the software practitioner. If the input information indicates that a software practitioner desires to upload the executable firmware to the target embedded circuit module 160, then processing advances to 430. Processing at 430 is described in more detail with respect to FIG. 11. After processing at 430, processing will return to 406. Alternatively, processing and the software practitioner input will fall to 432.

At 432, the computing system will have accepted input from the software practitioner. If the input information indicates that a software practitioner desires to create a custom, user-defined sensor package, then processing advances to 434. Processing at 434 may be along the lines of processing at 206, 212, and 214 as discussed with respect to FIG. 2. After processing at 434, processing will return to 406. Alternatively, processing and the software practitioner input will fall to 436.

At 436, the computing system will have accepted input from the software practitioner. If the input information indicates that a software practitioner desires to operate the sensor prototype, then processing advances to 438. At 438, data generated by the prototyped sensor is collected, analyzed, or otherwise processed. Such processing may include subjecting the target embedded circuit module 160 to any number of environmental conditions (e.g., change in temperature, change in humidity, or the like), physical conditions (e.g., acceleration/motion, vibration, drop-testing, rotation, flexion, or the like), electric conditions (over-voltage, under-voltage, current-limiting, static discharge, or the like), magnetic condition, or any other such conditions. In processing at 440, the received data may be displayed in any way desired by the software practitioner, and some or all of the data may be communicated to a repository or another computing device. After processing at 440, processing will return to 406. Alternatively, processing and the software practitioner input will fall to 442.

At 442, the computing system will have accepted input from the software practitioner. If the input information indicates that a software practitioner desires to exit the method to prototype an embedded peripheral 400, then processing advances to and terminates at 444. Alternatively, processing will revert back to 406.

Figure 5:
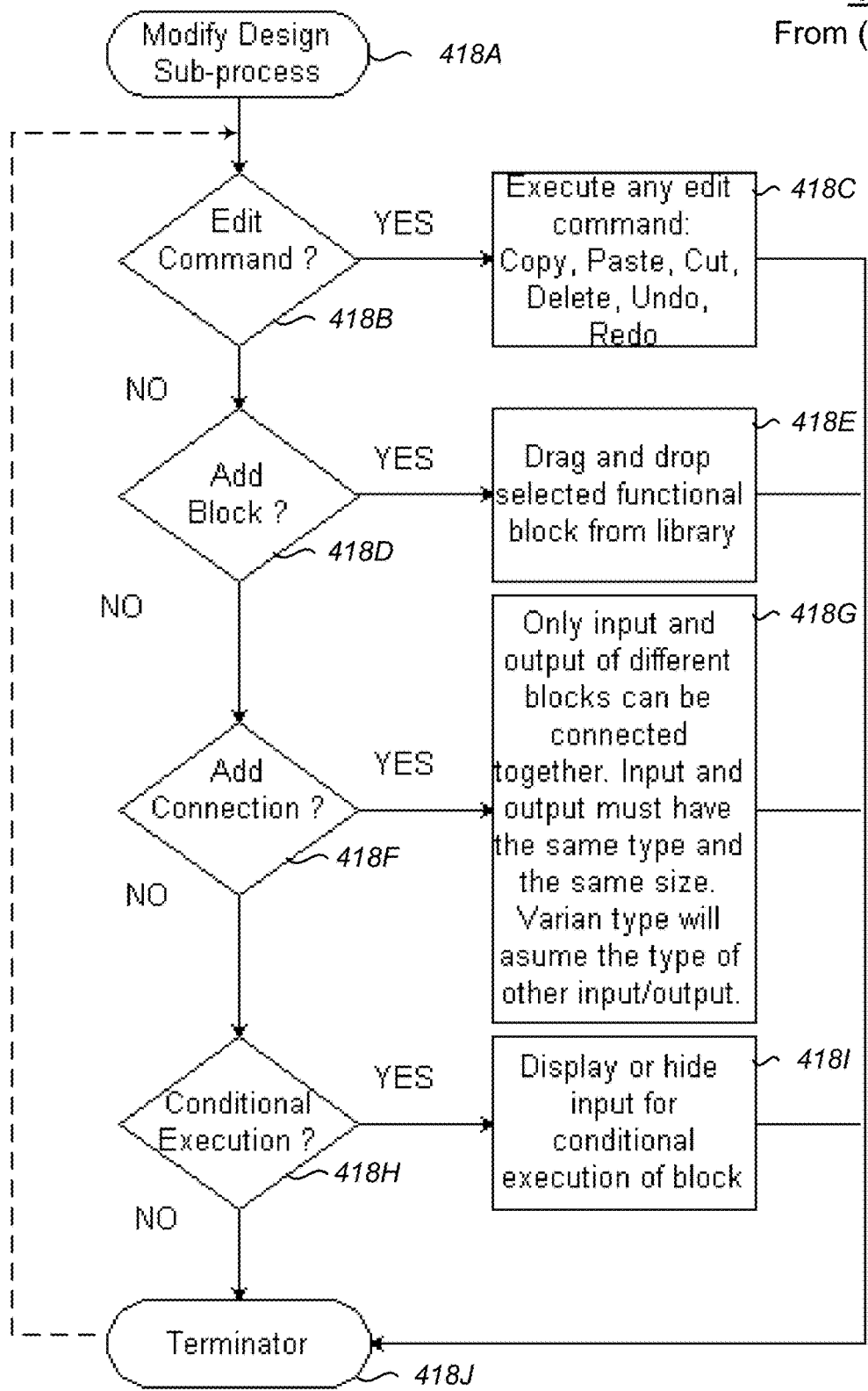
FIG. 5 is an exemplary data flow diagram of method to modify an embedded peripheral prototype design.

FIG. 5 is an exemplary data flow diagram of method to modify an embedded peripheral prototype design 418. One of skill in the art will recognize similarities and distinctions between the embedded peripheral prototype design 418 and the processing in FIG. 2 at 206 to 224. In processing at 418 in FIG. 5, processing begins at 418A. Input information from the software practitioner is analyzed in any number of conditional processing acts. In processing at 418B, if the software practitioner desires to edit an embedded peripheral prototype design, processing advances to 418C. In processing at 418D, if the software practitioner desires to add additional functionality to an embedded peripheral prototype design, processing advances to 418E. In processing at 418F, if the software practitioner desires to add or otherwise modify any number of an electrical or communicative connections (e.g., one or more communicative coupling arrangements) in an embedded peripheral prototype design, processing advances to 418G. And in processing at 418H, if the software practitioner desires to add or otherwise modify how data is produced, captured, displayed, or otherwise processed in the embedded peripheral prototype design, processing advances to 418I.

At 418J, in some cases, processing will return to 418 in FIG. 4A; alternatively and optionally, processing may remain in the process to modify an embedded peripheral prototype design 418.

At 418C, the software practitioner can perform any number of editing operations to the embedded peripheral prototype design, and at 418E, the software practitioner may add further functionality to the embedded peripheral prototype design. For example, a software practitioner may desire to create a comprehensive, multi-sensor prototype. In a first portion of the design process, the software practitioner may add an accelerometer to the embedded peripheral prototype design. In a second portion, the software practitioner may add a gyroscope. In subsequent portions of the design process, the software practitioner may add environmental sensors, clocks, or any other type of functionality. In this way, without limitation, it is recognized that a software practitioner can progressively create a multi-function embedded peripheral prototype design in a very efficient manner. Functional blocks may be added, tested, removed, and further tested to teach the software practitioner how such a prototyped sensor will perform in actual production. Such testing may reveal how sensors conditioned with any desirable set of parameters may interact with each other and with the outside world.

In processing at 418G, the software practitioner is able to add electrical, communicative, and any other types of connectivity to the embedded peripheral prototype design. Processing at 418G may include processing along the lines described with respect to 208 at FIG. 2 wherein automatic verification by the computing system will permit validated connections to be made and invalid connections to be rejected. The automatic verification may include matching a number of outputs of a first module to a number of inputs of a second module, matching signal levels (e.g., amplitude, current) of a first module to signal levels of a second module, matching clock rates of a first module to a second module, matching data types (e.g., integers, floating point values, units of measure, and the like) of a first module to data types of a second module, and any other type of connection verifications. In some cases, the parameters associated with connectivity of a module are directed by parameters set by the software practitioner. In these cases, the processing at 418G may provide an alert to the software practitioner (e.g., a display object, an audio sound, or the like), and such alert may further invite the software practitioner to adjust any particular parameter.

Considering one exemplary and non-limiting embodiment of use with respect to 418C, 418E, 418G, and 418I, a software practitioner has a desire to modify a sensing device prototype project that has already been created. Earlier, for example, the software practitioner has configured a computer system with the design tools to generate the sensing device prototype project. The software practitioner opened a design editor via a user interface of the computing system and selected a plurality of function blocks representing one or more separate and distinct modular electronic circuits. Each of the function blocks is formed of a library (e.g., binary code, object code, source code, extensible markup language code, or some other form of library) that will be used in the building of the sensing device prototype project. After selecting the desired function blocks, or during the selection process, the software practitioner communicatively coupled various ones of said plurality of selected functional blocks via one or more data communication paths. The communicative coupling arrangements were automatically verified for compatibility between each selected function block by the design tools. Subsequent to the configuration process where the software practitioner added and communicatively coupled function blocks, the software practitioner carried out a process to automatically generate high-level source code to implement at least some portions of the plurality of selected functional blocks and at least some portions of the one or more data communication paths. The high-level source code generation process resulted in a sensing device prototype project high-level software package. Because the sensing device prototype project is at this point rendered in high-level software, the software practitioner may view, add to, delete, or modify the project with any selected high-level software editor or tool set. Once satisfied with the high-level software, whether changes were made or not, the software practitioner performed a build process (e.g., merge, compile, link, locate, and the like) on the sensing device prototype project high-level software package to produce loadable firmware. The loadable firmware, which is executable by a particular embedded circuit module having the sensing device that is being prototyped, was passed through a suitable communication interface and loaded into a memory of the embedded circuit module. The loadable firmware includes executable instructions, and the instructions were executed using a processor of the embedded circuit module. Data (e.g., digital data, analog data, or any combination thereof) that was produced by the sensing device that is being prototyped was collected.

Upon analyzing the collected data, the software practitioner had a desire to manually select at least one parameter associated with the sensing device that is being prototyped, and the software practitioner had a desire to change that particular parameter. For example, if the sensing device that is being prototyped is micro-electro-mechanical (MEMS) based sensing device such as an accelerometer, the software practitioner may have desired to change a data rate, change an input force limitation, or some other parameter. In order to make such changes, processing in FIG. 5 may be invoked.

Upon making the desired change to modify at least one parameter associated with the sensing device that is being prototyped, the software practitioner will perform a re-building process on the sensing device prototype project high-level software package to produce updated loadable firmware, and the software practitioner will load the updated loadable firmware into the memory of the embedded circuit module. When the updated instructions are executed using the processor of the embedded circuit module, the software practitioner will collect updated digital data produced by the prototyped sensing device.

Processing at 418I may include selection of any number and type of display value functions. In at least some cases, the display value functions are along the lines of those indicated with respect to FIG. 3.

Figure 6A:
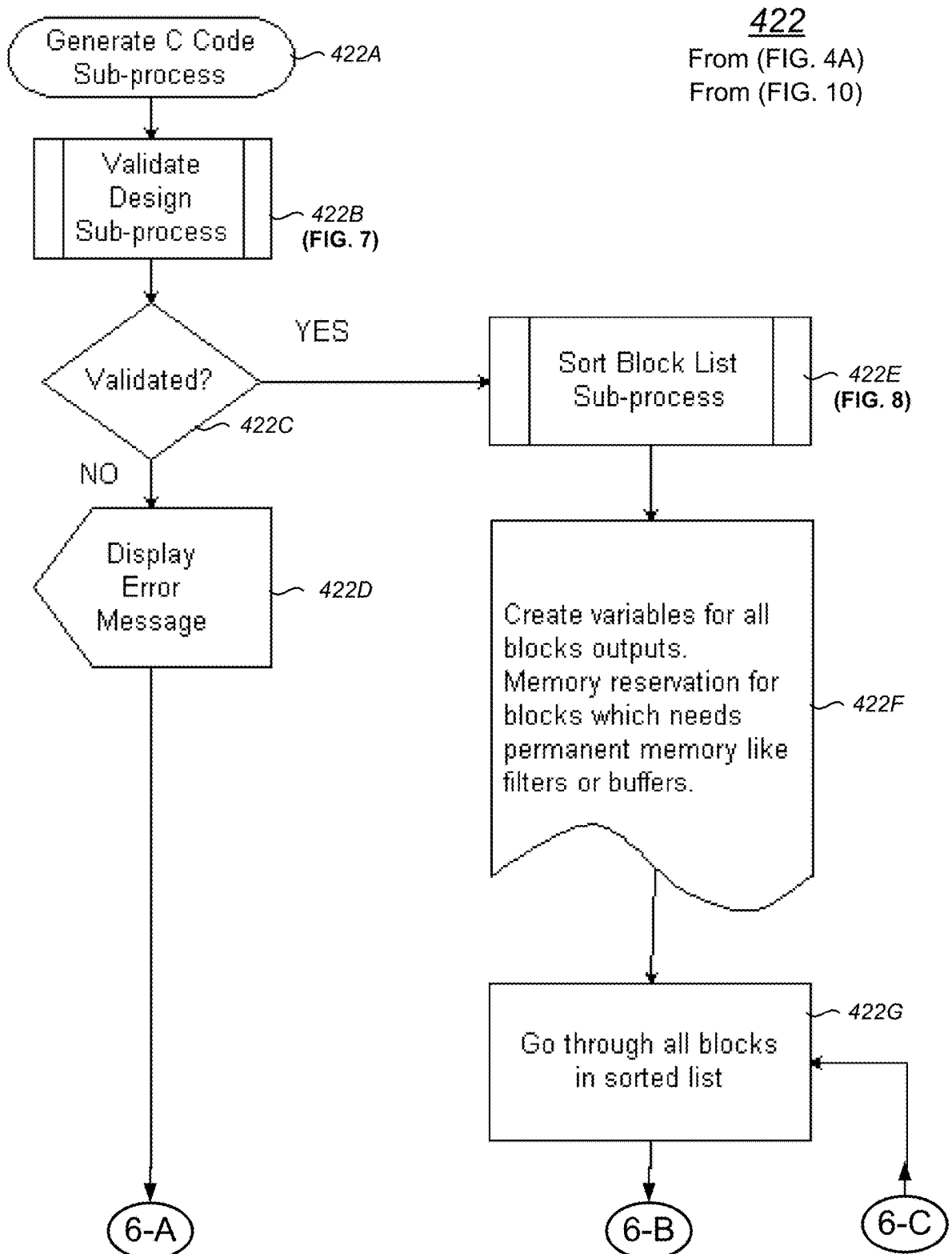
FIGS. 6A and 6B are a process to generate high-level software code in the exemplary method to prototype an embedded peripheral.
Figure 6B:
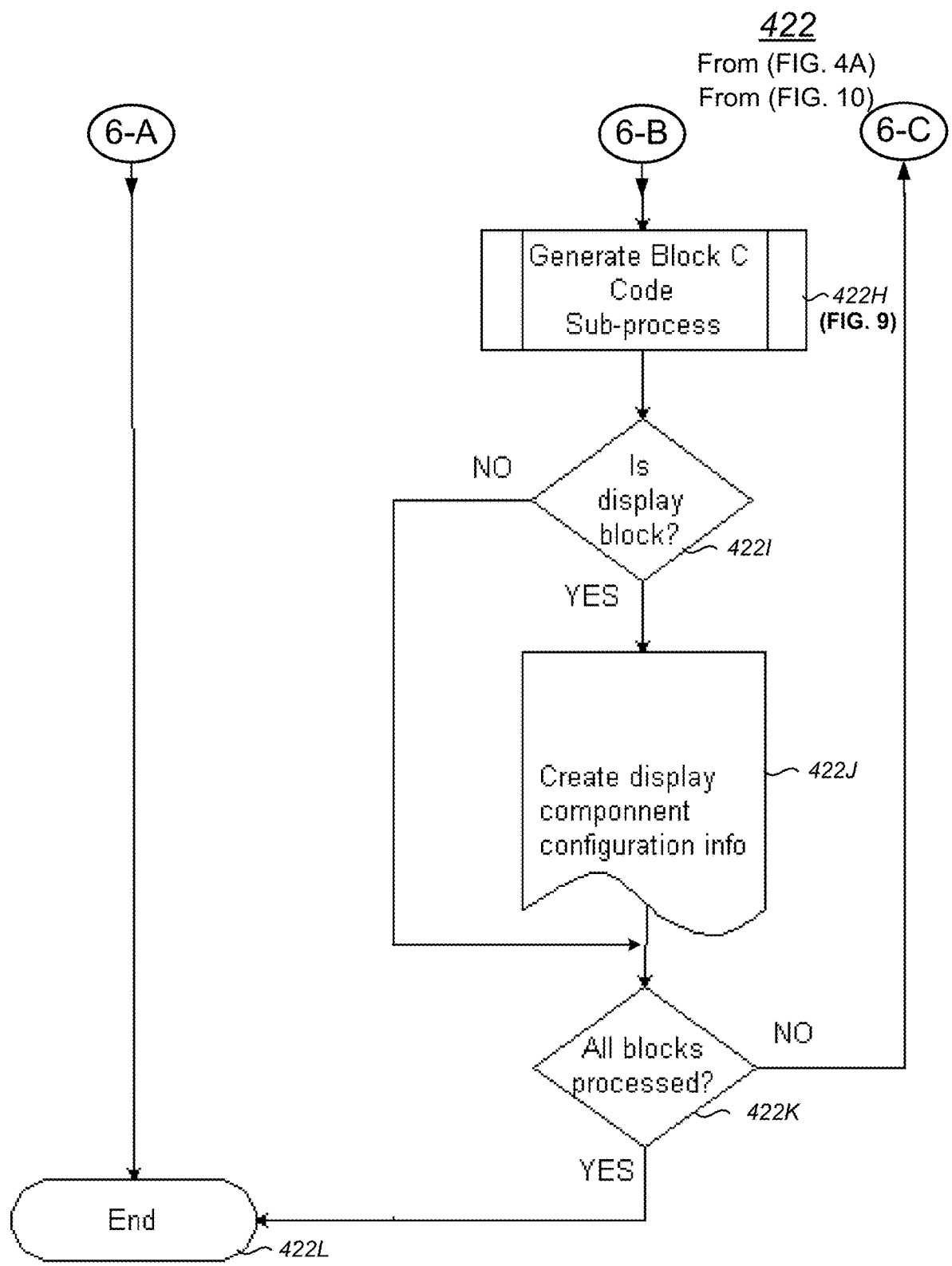

FIGS. 6A and 6B are a process to generate high-level software code in the exemplary method to prototype an embedded peripheral 400. One of skill in the art will recognize similarities and distinctions between the method to generate high-level software code described herein and the exemplary data flow embodiment to prototype an embedded peripheral 200 at processing node 216 in FIG. 2. To avoid confusion, one or both of FIGS. 6A and 6B may be referred to as FIG. 6.

Processing at FIG. 6 begins at 422A. At 422B, the design of the embedded peripheral prototype 400 is validated (e.g., via access and processing in cooperation with a validity database 114 (FIG. 1) or some other repository). The processing to validate the embedded peripheral prototype 400 is described with respect to FIG. 7.

At 422C, if the embedded peripheral prototype 400 design is validated, processing advances to 422E where a sort block list sub-process is carried out. The processing to perform the sort block list sub-process is described with respect to FIG. 8. Continuing at 422C, if the embedded peripheral prototype 400 design is not validated, processing advances to 422D where an error message of any desired type (e.g., display object, an audio signal, or the like) is presented to the software practitioner. The software practitioner may be invited to correct the error. After presenting the error message at 422D, processing to generate high-level software code for the embedded peripheral prototype 400 terminates at 422B-K with the returned condition of a failure-to-generate-code.

After performing the sort block list sub-process at 422E, processing advances to 422F. Parameters and conditions to instantiate the embedded peripheral prototype 400 are created, initialized, or otherwise prepared. In some cases, portions of high-level source code are captured and copied into a particular memory space. In these and other cases, high-level source code is "written" to the memory space to perform, when built into executable code, the instantiation of the embedded peripheral prototype 400. Generation of the initialization data at 422F may be facilitated by the sorting of function blocks performed at 422E. For example, via the sorting, any number of variables, constants, strings, subroutines, processes and the like are not generated multiple times and with other prospective conflicts, informalities, and inefficiencies.

Processing advances to the block-by-block iterative processing cluster that includes 422G, 422H, 422I, 422J, and 422K. Other methods of generating high-level source code can be performed, but it has been discovered that sorting a block list, and then generating high-level source code for each block on the block list produces tight, efficient source code.

At 422G, a selected block on the sorted block list is processed. High-level source code for the selected block is generated at 422H. Generating high-level source code for each selected block at 422H is discussed with respect to FIG. 9.

Figure 10:
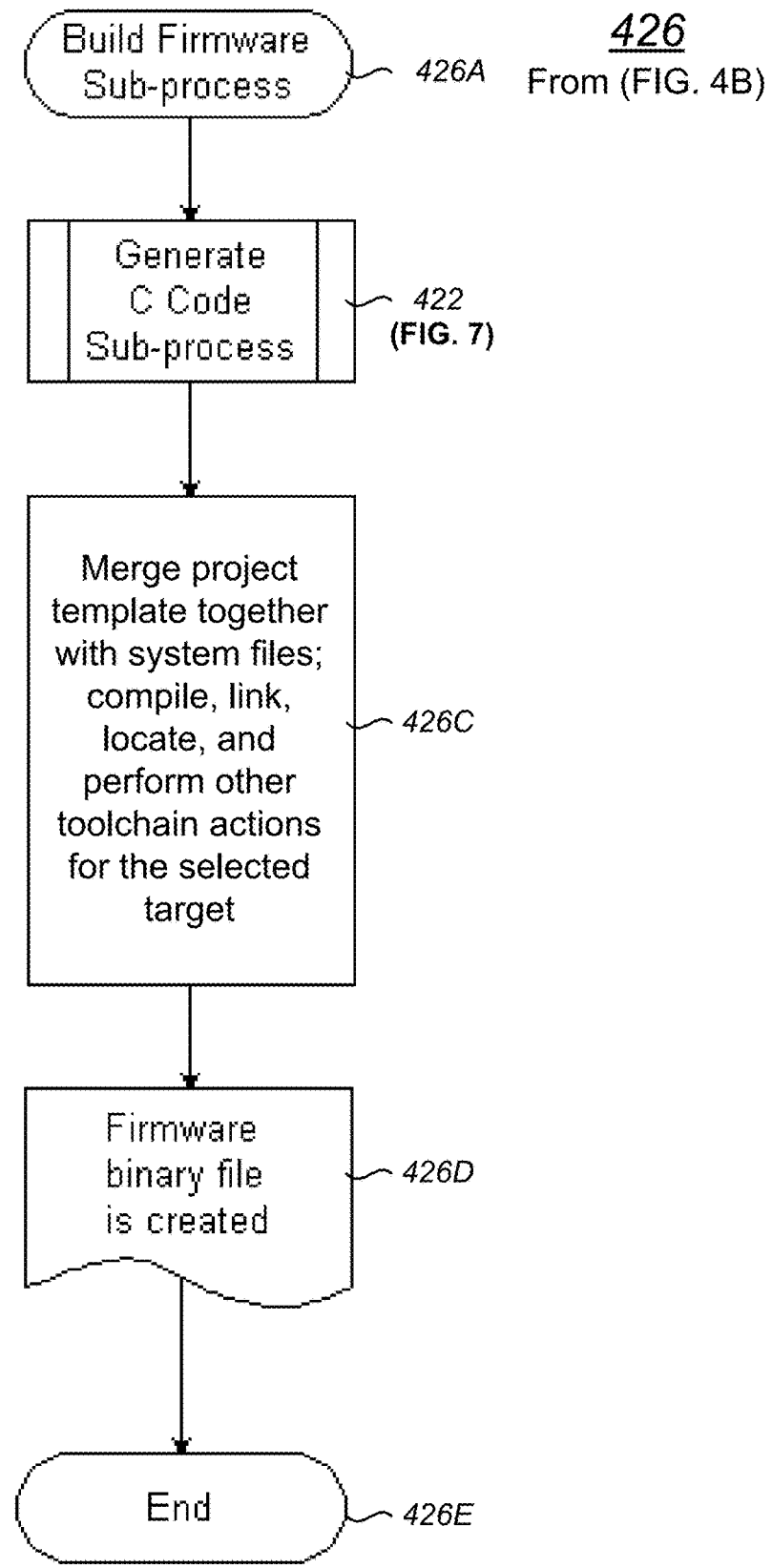
FIG. 10 is a process to build downloadable software in the exemplary method to prototype an embedded peripheral.

Processing at 422H ends and passes to 422I. At 422I, if the selected block undergoing code-generation is a display block, then high-level software for the display component is created. The generation of the high-level software may include drawing data from any number of parameters selected by the software practitioner. At least some selected parameters associated with display components are discussed with respect to FIG. 3 and are not repeated here for brevity. At the conclusion of display component processing, or if the block being processed is not a display component as determined at 422I, processing advances to 422K. If un-processed blocks remain on the block list, processing returns to 422G. Alternatively, processing to generate high-level software code in FIG. 6 terminates at 422B-K and returns to processing from where it was called (FIG. 4A; FIG. 10).

Figure 7A:
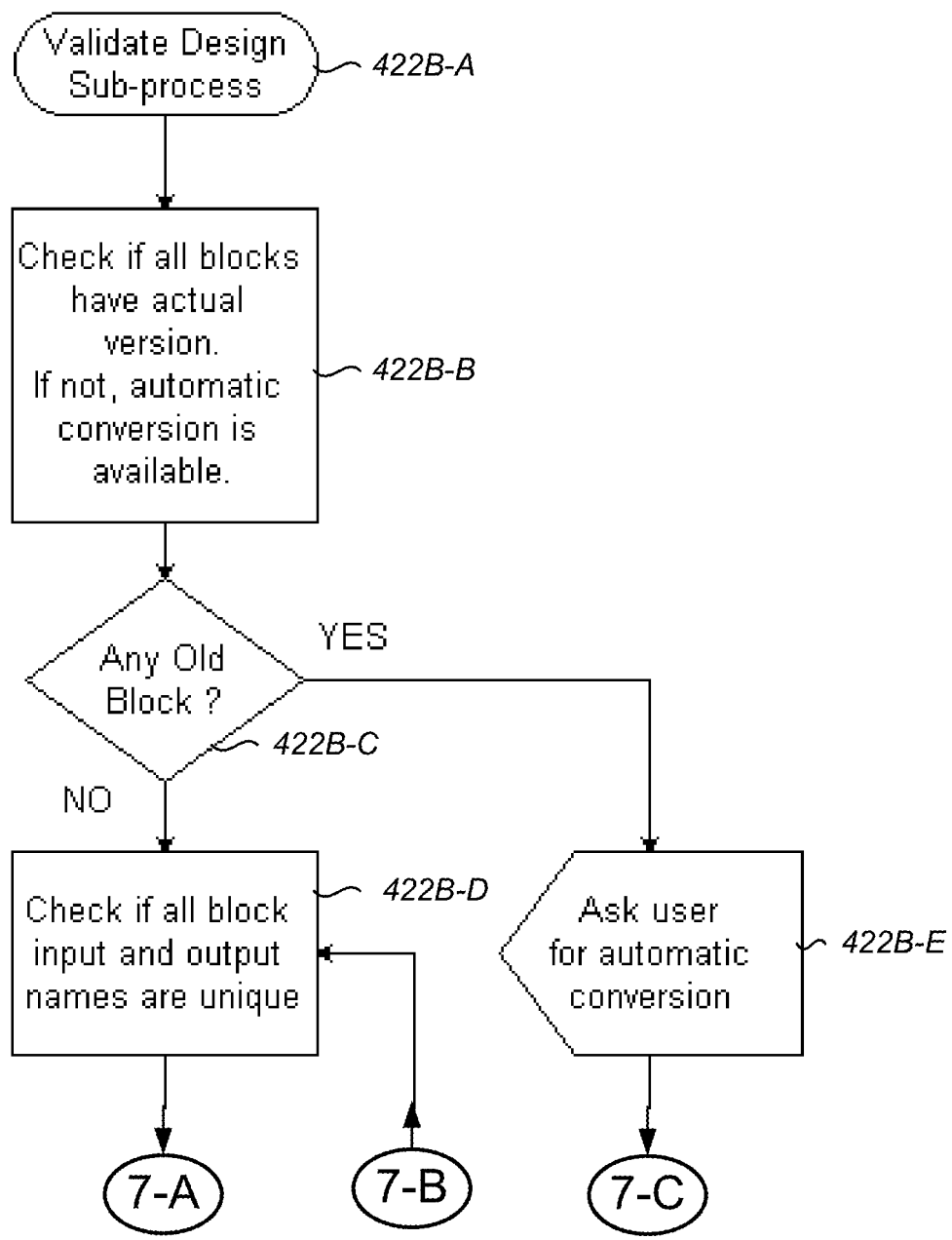
FIGS. 7A and 7B are a process to validate an embedded peripheral prototype.
Figure 7B:
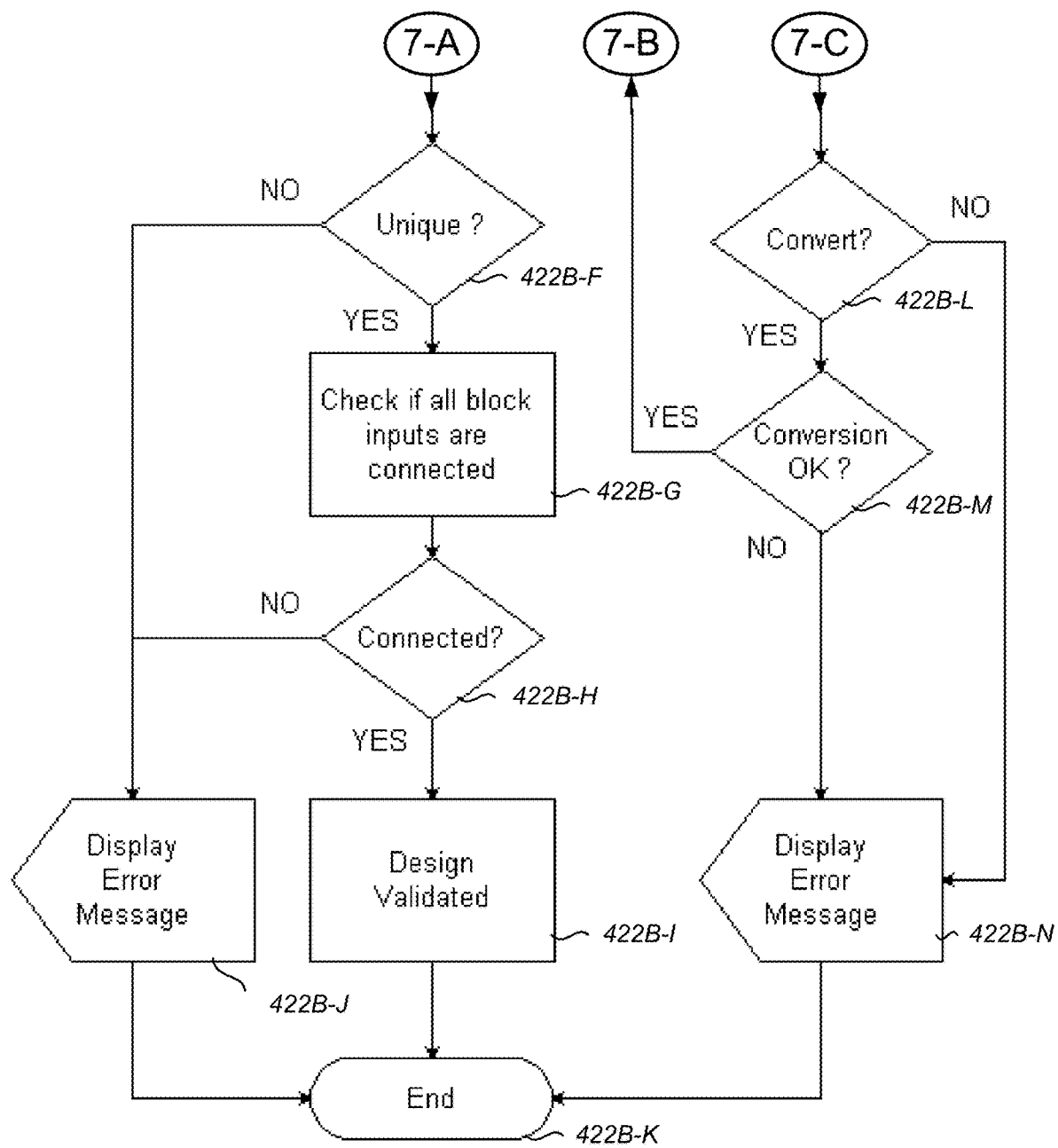

FIGS. 7A and 7B are a process to validate an embedded peripheral prototype 400. One of skill in the art will recognize similarities and distinctions between the method to validate the embedded peripheral prototype 400 described herein and the exemplary data flow embodiment to prototype an embedded peripheral 200 at processing node 216 in FIG. 2. To avoid confusion, one or both of FIGS. 7A and 7B may be referred to as FIG. 7.

Processing at FIG. 7 begins at 422B-A. At 422B-B, each block included by the software practitioner is verified for compatibility with each other function block. Such verifying may be performed with respect to a version number or some other versioning information. By including versioning information, the method to prototype an embedded peripheral 400 may continually evolve underlying function blocks, amend function blocks, revert to earlier versions of function blocks, perform security operations, and the like. In some embodiments, automatic conversion is included. Such automatic versioning may include copying stored data, interrogating a database, performing network based inquiries (e.g., via the Internet, an intranet, or some other network), or the like.

At 422B-C, processing determines whether or not any of the function blocks selected by the software practitioner are "old," or otherwise incompatible based on the versioning information. If at least one incompatible (e.g., old) block is identified, processing advances to 422B-E where a software practitioner is invited to elect automatic conversion (e.g., via a display object or some other inquiry mechanism). Alternatively, processing advances to 422B-F.

If the software practitioner, in processing at 422B-E, is invited to elect automatic conversion, processing advances to 422B-L. If the software practitioner declines automatic conversion, processing falls to 422B-N. Alternatively, the automatic conversion is performed at 422B-M. If the automatic conversion is successful, processing advances to 422B-D. Else, processing falls to 422B-N. At 422B-N, an error message is presented (e.g., a display object, an audio object, or the like), and processing to validate the embedded peripheral prototype 400 terminates at 422B-K with the returned condition of a failure-to-validate.

At 422B-D, which operations are combined with processing at 422B-F, various pieces (e.g., one or more bits, words, integers, keys, strings, or the like) of identification information for each function block are verified. In some cases, input information and output information for each function block is uniquely identified via a name, number, key-value, or some other indicator. By providing such unique naming information in some embodiments, any number of lists can be generated to validate compatibility of a first function block to a second function block and vice-versa. For example, if two function blocks in such an embodiment have each other's naming information on an associated list, it can be automatically validated that the two function blocks are bi-directionally compatible. If naming information is found on the associated list of only one function block, it may be determined that the function blocks are uni-directionally compatible, but not bi-directionally compatible. The naming or otherwise identification information can be used in other ways.

After verification in 422B-D and 4224B-F that all of the relevant identification information is unique or otherwise suitable, processing advances to 422B-G. If the verification at 422B-D and 422B-F fails, then processing passes through 422B-J to present an error message (e.g., a display object, an audio object, or the like), and processing terminates at 422B-K with the returned condition of a failure-to-validate.

In processing at 422B-G, which operations are combined with processing at 422B-H, the connections between modules defined or otherwise selected by the software practitioner for the embedded peripheral prototype 400 are verified. Such verification may test inputs, outputs, data types, parameters, and any other desired functionality. If such tests are not passed, then processing passes through 422B-J to present an error message (e.g., a display object, an audio object, or the like), and processing terminates at 422B-K with the returned condition of a failure-to-validate. If such tests are passed, then processing passes through 422B-I, which may optionally present a success message (e.g., a display object, an audio object, or the like), and processing terminates at 422B-K with the returned condition of a validation-success.

Figure 8A:
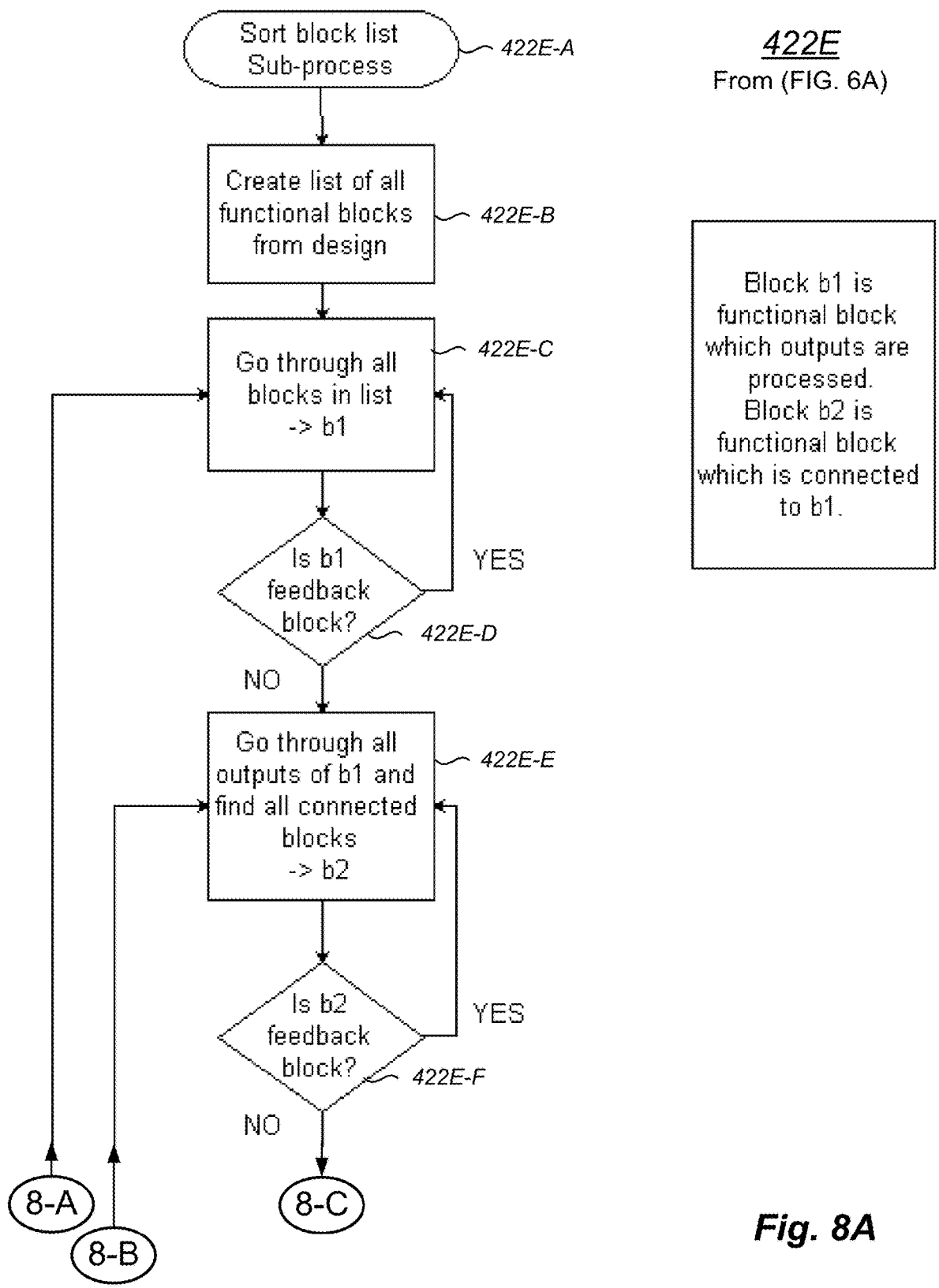
FIGS. 8A and 8B are a process to sort a block list in the exemplary method to prototype an embedded peripheral.
Figure 8B:
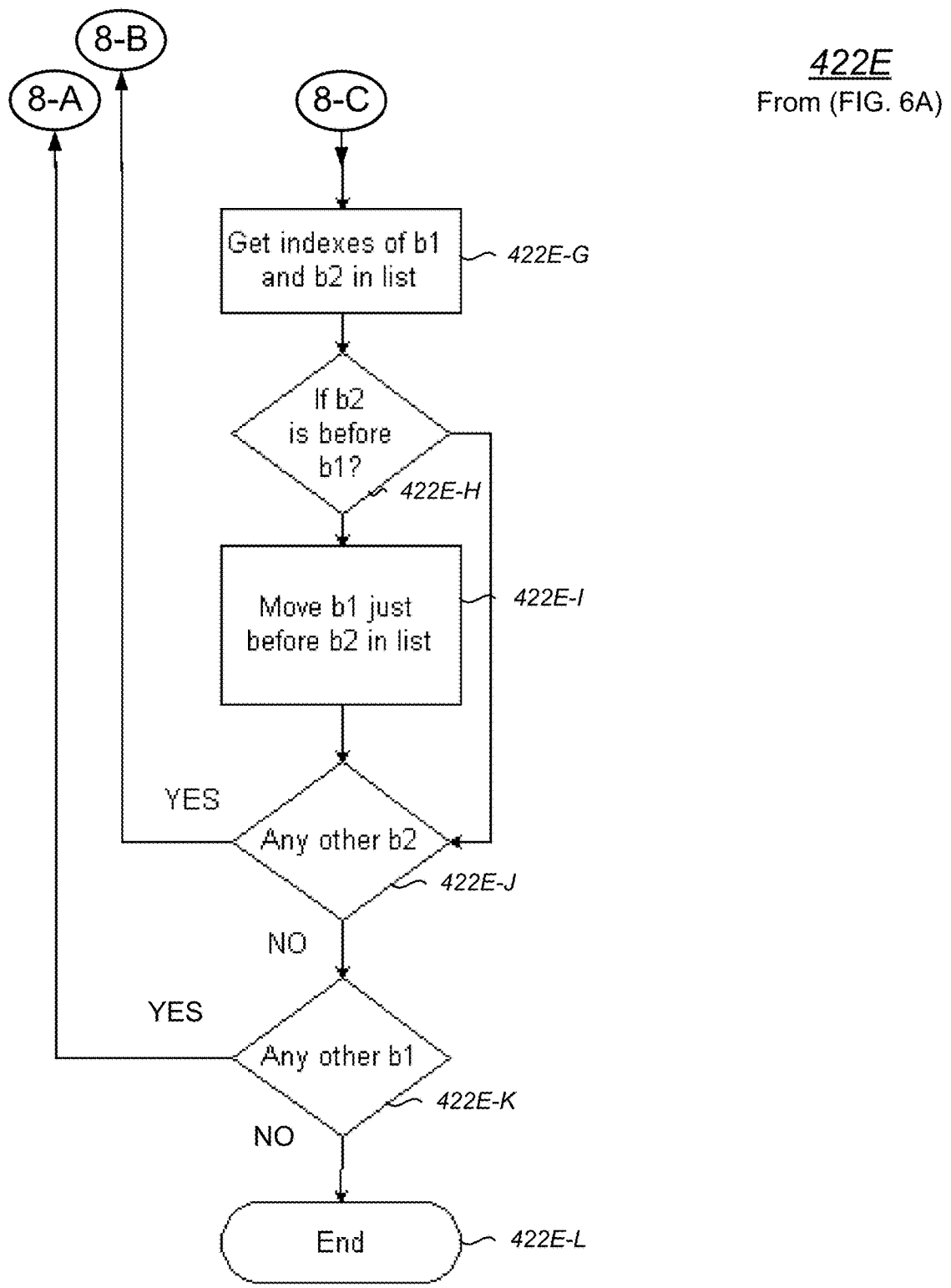

FIGS. 8A and 8B are a process to sort a block list in the exemplary method to prototype an embedded peripheral 400. One of skill in the art will recognize similarities and distinctions between the method to generate high-level software code described herein and the exemplary data flow embodiment to prototype an embedded peripheral 200 at processing nodes 206, 208, 210, 212, and 214 in FIG. 2. To avoid confusion, one or both of FIGS. 8A and 8B may be referred to as FIG. 8.

Processing at FIG. 8 begins at 422E-A. At 422E-B, a list of all of the functional blocks selected for inclusion in the design of the embedded peripheral prototype 400 is created. The list of function blocks will include those manually selected or designed by the software practitioner. Other functional blocks may automatically be selected by the computing device. In at least some embodiments, the automatically selected blocks include system functions, administrative functions, and other such function blocks.

In FIG. 8, a function block list is created to facilitate validation of function block compatibility. In at least one case, generating a function block list and sorting the function block list provides a mechanism for any one or more of more efficient validation of communicative coupling arrangements, more efficient generation of high-level software, more efficient testing of a sensing device prototype project high-level software package, and for other reasons.

The embodiment of FIG. 8 to sort a block list for the embedded peripheral prototype 400 is discussed with respect to a first block, b1, and a second block, b2. Block b1 is a functional block having outputs to be processed. Block b2 is a functional block connected to block b1. In the processing, each block on the list takes its respective turn to be interrogated as block b1 and block b2. It is apparent that a sorting process is along the lines of a nested bubble-sort type of processing. The embodiment of FIG. 8 is exemplary, and other mechanisms to sort a block list are contemplated.

At 422E-C and 422E-D, each block on the list to be sorted is processed as a first block, b1, and it is determined if the subject block b1 is a feedback block. If so, processing of a next block is performed; else processing of the block advances to the cluster at 422E-E and 422E-F. In 422E-E and 422E-F, each of the outputs of block b1 that is connected to block b2 is identified. If block b2 is not a feedback block, processing advances to 422E-G.

In processing at 422E-G, indexes of blocks b1 and b2 in the list are retrieved. Processing advances to the cluster at 422E-H and 422E-I. If block b2 is before block b1 in the list, then block b1 is moved to be before block b2 in the list. If not, processing falls to conditional processing at one or both of 422E-J and 422E-K.

In processing at conditional block 422E-J, it is determined if additional blocks b2 remain to be processed. If so, processing returns to 422E-E, and if not, processing falls to 422E-K.

In processing at conditional block 422E-K, it is determined of additional blocks b1 remain to be processed. If so, processing returns to 422E-C, and if not, processing terminates at 422E-L.

Figure 9A:
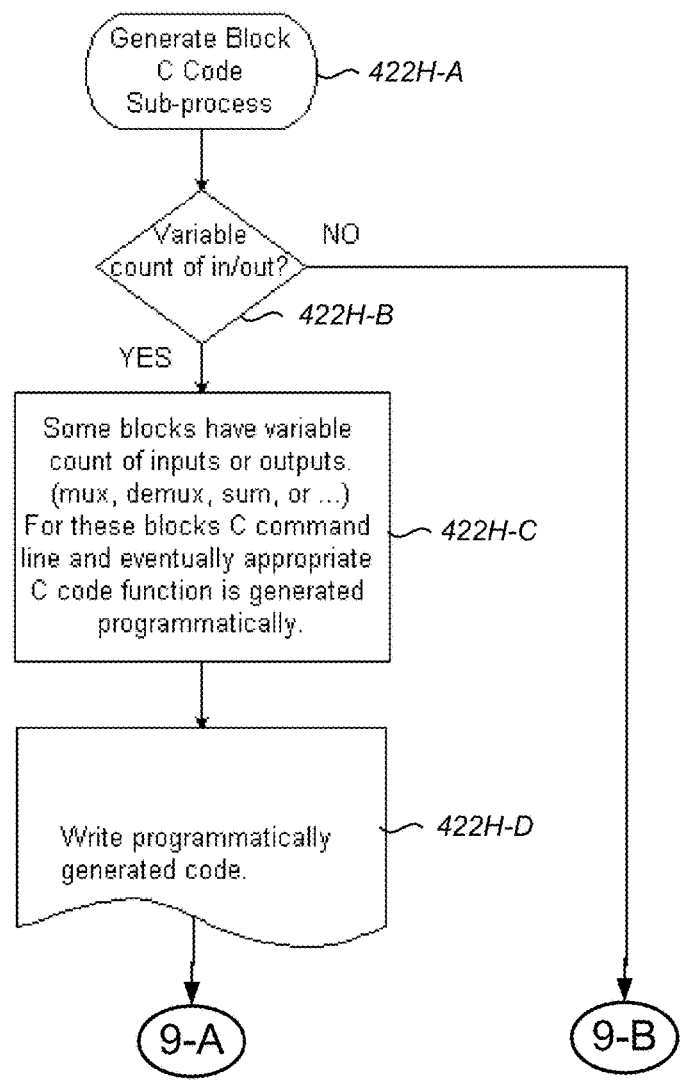
FIGS. 9A and 9B are a process to generate high-level source code for a function block in the exemplary method to prototype an embedded peripheral.
Figure 9B:
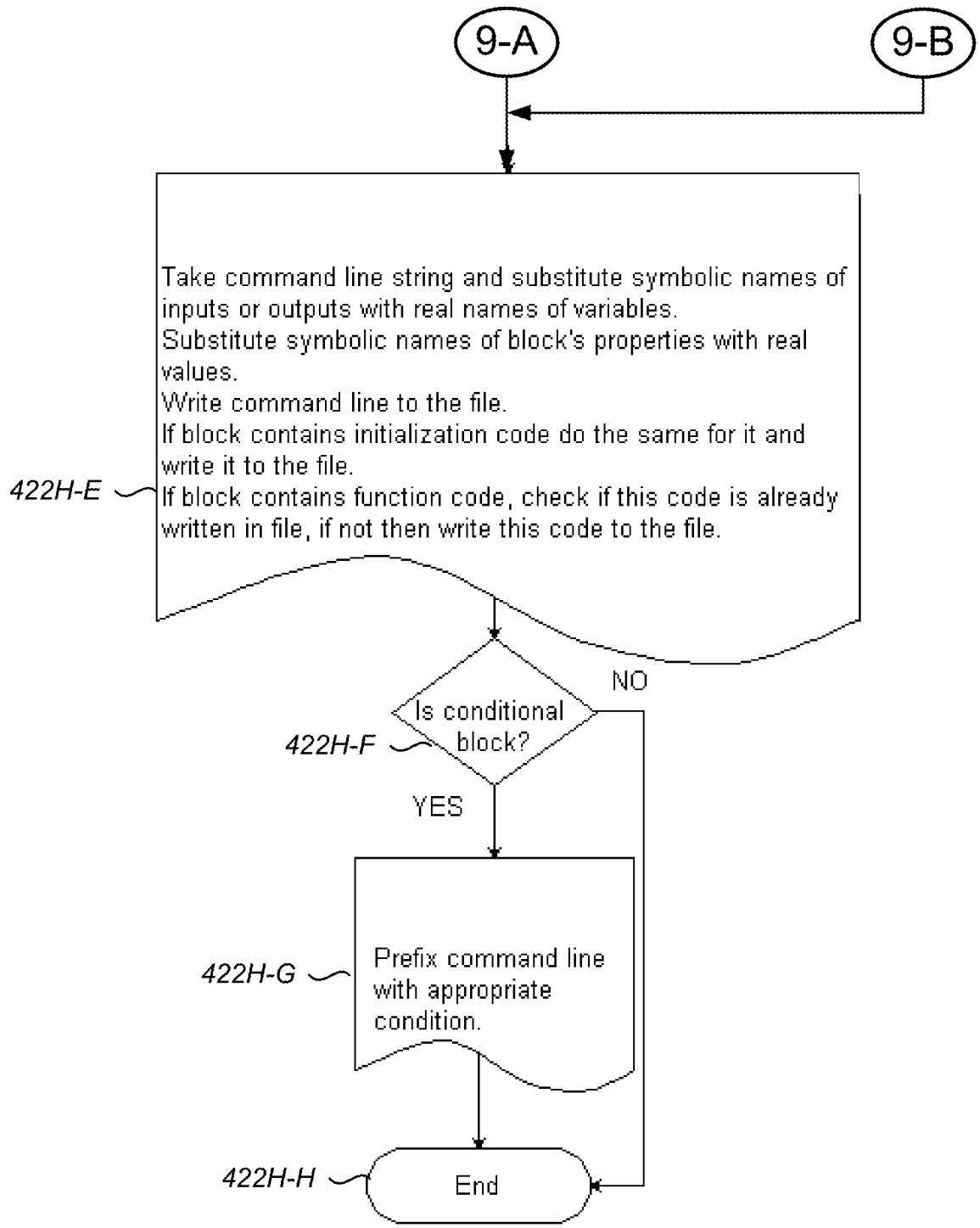

FIGS. 9A and 9B are a process to generate high-level source code for a function block in the exemplary method to prototype an embedded peripheral 400. One of skill in the art will recognize similarities and distinctions between the method to generate high-level software code described herein and the exemplary data flow embodiment to prototype an embedded peripheral 200 in FIG. 2. To avoid confusion, one or both of FIGS. 9A and 9B may be referred to as FIG. 9. In the non-limiting and exemplary embodiment of FIG. 9, command lines are placed in a function that is called in any number of computation acts. The frequency of calling may be defined by a timer, a counter, an output data rate of one more sensors, or by some other means. In at least one case, functions may be programmatically generated or retrieved from a repository (e.g., an XML file, a database, a network location, a dialog box, a user input mechanism, or some other source). In at least some cases, block initialization code may be placed in an function block to be called only once at the beginning of a program. More or fewer features are contemplated as recognized by one of skill in the art and not further described.

Processing at FIG. 9 begins at 422H-A. At 422H-B, it is determined whether or not the number of inputs and the number of outputs for the function block is variable. If not, processing falls to 422H-E; else processing advances to 422H-C.

In processing at 422H-C, switching devices (e.g., multiplexors, de-multiplexors, adders and other computational function, combinatorial gating logic, and the like are processed. Based on the underlying function, high-level source code (e.g., for-loops, do-while loops, conditional statements, case statements, and the like) are programmatically generated. The programming, for example, may generate a particular conditional or selection operator and then programmatically add as many operators as necessary based on the parameters of the block. In processing at 422H-D, the generated program code is stored or otherwise captured for the block, and processing advances to 422H-E.

At 422H-E, command line strings are retrieved or otherwise generated, and symbolic names are replaced with variable names, various properties are replaced with parameter values selected by the software practitioner (actively or by default), and other such substitutions are made. The generated high-level source code may then selectively be stored in the file or other repository.

In processing at the cluster of 422H-F and 422H-G, conditional function blocks, along the lines of those discussed with respect to FIG. 3, are processed. Labels, referential values, prefixes, or other such programmatic identifiers are in some cases added.

Upon generation of the high-level source code for a function block for the embedded peripheral prototype 400, processing terminates at 422H-H. FIG. 10 is a process to build downloadable software in the exemplary method to prototype an embedded peripheral 400. One of skill in the art will recognize similarities and distinctions between the method to generate high-level software code described herein and the exemplary data flow embodiment to prototype an embedded peripheral 200 at processing node 218 in FIG. 2.

Processing in FIG. 10 begins at 426A, and optionally, if high-level source code has not been generated, processing advances and passes through 422 (FIG. 7). In some cases, high-level software has already been generated, and such software has been selectively modified by a software practitioner. In these cases, or in other cases, the processing at 422 (FIG. 7) may be performed or re-performed.

At 426, the tools of any desirable toolchain are invoked and executed. The high-level source code is merged, with an optional template, for example, and the merged code is compiled, linked, located, and otherwise formatted to a particular embodiment. In at least some cases, the particular template is one of a plurality of pre-prepared firmware templates 118 (FIG. 1) merged into a user-defined sensing device prototype package 116 (FIG. 1) by a combinatorial logic module 120 (FIG. 1). At 426D, the firmware binary file is created by the selected toolchain. The firmware binary file may be generated for operation on embedded circuit module 160.

Processing ends at 426E.

Figure 11:
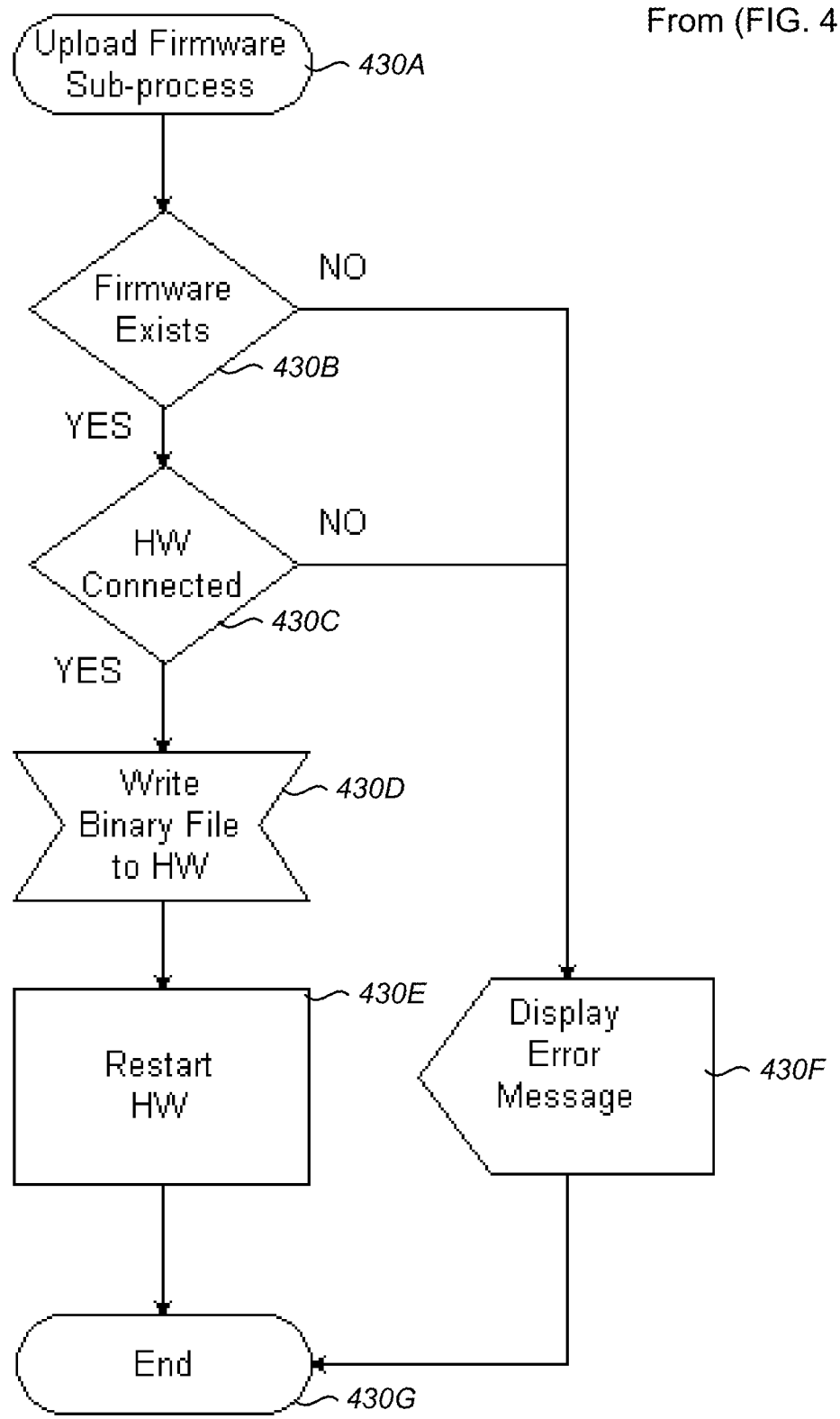
FIG. 11 is a process to upload (e.g., copy, transmit, download, communicate, or the like) downloadable software in the exemplary method to prototype an embedded peripheral.

FIG. 11 is a process to upload (e.g., copy, transmit, download, communicate, or the like) downloadable software in the exemplary method to prototype an embedded peripheral 400. One of skill in the art will recognize similarities and distinctions between the method to generate high-level software code described herein and the exemplary data flow embodiment to prototype an embedded peripheral 200 at processing node 218 in FIG. 2.

Processing in FIG. 11 begins at 430A. If it is determined at 430B that the firmware does not exist, or if it is determined at 430C that the embedded circuit module 160 is not connected or is otherwise unavailable, then processing passes through 430F to present an error message (e.g., a display object, an audio object, or the like), and processing terminates at 430G with the returned condition of a failure-to-upload. Alternatively, if the firmware is found to exist at 430B and the embedded circuit module 160 is connected and available as determined at 430C, then the firmware is communicated and stored in the embedded circuit module 160. The embedded circuit module 160 is restarted, begins to operate and collect data according to parameters selected by the software practitioner, and processing terminates at 430G.

The present disclosure refers to a "software practitioner." A software practitioner is generally one of ordinary skill in the software design and development arts. The software practitioner may be a degreed engineer, a degreed scientist, or another technical person having such skill as to write, modify, maintain, build, operate, direct, or otherwise interact with software. The software may be directly or indirectly written in a high-level language, low-level language, interpretive language, or the like. The software directly, or with further processing, is executable by one or more processing units of a computing device. The software practitioner may direct and balance particular features of a set of software programs (e.g., a project) such as selection of intellectual property (IP) modules, presentation of information via a user interface, application of test data, and the like. The software practitioner may or may not understand each detail of the software build and execution processes carried out to create executable code (e.g., firmware), load executable code, generate data, collect data, communicate data, and process the data.

FIG. 2 includes a data flow diagram illustrating non-limiting processes that may be used by embodiments of the computing devices included in an embedded sensor prototype system 100 described herein. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing device embodiments such as computing device 150 and embedded circuit module 160. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Amongst other things, the exemplary computing devices of the present disclosure (e.g., computing device 150 and embedded circuit module 160 of FIG. 1) may be configured in any type of mobile or stationary computing device such as a remote cloud computer, a computing server, a smartphone, a tablet, a laptop computer, a wearable device (e.g., eyeglasses, jacket, shirt, pants, socks, shoes, other clothing, hat, helmet, other headwear, wristwatch, bracelet, pendant, other jewelry), vehicle-mounted device (e.g., train, plane, helicopter, unmanned aerial vehicle, unmanned underwater vehicle, unmanned land-based vehicle, automobile, motorcycle, bicycle, scooter, hover-board, other personal or commercial transportation device), industrial device (e.g., factory robotic device, home-use robotic device, retail robotic device, office-environment robotic device), or the like. Accordingly, the computing devices include other components and circuitry that is not illustrated, such as, for example, a display, a network interface, memory, one or more central processors, camera interfaces, audio interfaces, and other input/output interfaces. In some cases, the exemplary computing devices may also be configured in a different type of low-power device such as a mounted video camera, an Internet-of-Things (IoT) device, a multimedia device, a motion detection device, an intruder detection device, a security device, a crowd monitoring device, or some other device.

Processors, as described herein, include central processing units (CPU's), microprocessors, microcontrollers (MCU), digital signal processors (DSP), application specific integrated circuits (ASIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. A processor may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

In some cases, the processor or processors described in the present disclosure, and additionally more or fewer circuits of the exemplary computing devices described in the present disclosure, may be provided in an integrated circuit. In some embodiments, all of the elements shown in the processors of the present figures may be provided in an integrated circuit. In alternative embodiments, one or more of the arrangements depicted in the present figures may be provided by two or more integrated circuits. Some embodiments may be implemented by one or more dies. The one or more dies may be packaged in the same or different packages. Some of the depicted components may be provided outside of an integrated circuit or die.

The processors shown in the present figures and described herein may be fixed at design time in terms of one or more of topology, maximum available bandwidth, maximum available operations per unit time, maximum parallel execution units, and other such parameters. Some embodiments of the processors may provide re-programmable functionality at run-time. Some or all of the re-programmable functionality may be configured during one or more initialization stages. Some or all of the re-programmable functionality may be configured on the fly with no latency, maskable latency, or an acceptable level of latency.

As known by one skilled in the art, a computing device as described in the present disclosure, and computing device 100 and embedded circuit module 160 being such a computing devices, have one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

The computing devices illustrated and described herein, of which computing device 150 and embedded circuit module 160 are examples, may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity, but are well understood by skilled practitioners.

When so arranged as described herein, each computing device may be transformed from a generic and unspecific computing device to a combination device comprising hardware and software configured for a specific and particular purpose. Along these lines, the features of the combination device bring improvements to the technological computing arts heretofore unseen and unknown.

Database structures, if any are present in the computing devices or supporting network devices described herein, may be formed in a single database or multiple databases. In some cases hardware or software storage repositories are shared amongst various functions of the particular system or systems to which they are associated. A database may be formed as part of a local system or local area network. Alternatively, or in addition, a database may be formed remotely, such as within a "cloud" computing system, which would be accessible via a wide area network or some other network.

In at least one embodiment, computing devices described herein may communicate with other devices via communication over a network such as network 102 in FIG. 1. The network may involve an Internet connection or some other type of local area network (LAN), wide area network (WAN), personal area network (PAN), or the like. Non-limiting examples of structures that enable or form parts of a network include, but are not limited to, an Ethernet, twisted pair Ethernet, digital subscriber loop (DSL) devices, wireless LAN, WiFi, cellular-based networks, BlueTooth transceivers, or the like.

Buttons, keypads, computer mice, memory cards, serial ports, bio-sensor readers, touch screens, and the like may individually or in cooperation be useful to an operator of the mobile device or other such devices as described herein. The devices may, for example, input control information into the system. Displays, printers, memory cards, LED indicators, temperature sensors, audio devices (e.g., speakers, piezo device, etc.), vibrators, and the like are all useful to present output information to the operator of these computing devices. In some cases, the input and output devices are directly coupled to the control systems described herein and electronically coupled to a processor or other operative circuitry. In other cases, the input and output devices pass information via one or more communication ports (e.g., RS-232, RS-485, infrared, USB, etc.)

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks, have not been shown or described in detail to avoid unnecessarily obscuring descriptions of the embodiments.

Unless the context requires otherwise, throughout the specification and claims which follow, the word "comprise," and variations thereof, such as "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method to prototype a sensing device, comprising:
  providing access to a computing system and a first user interface coupled to the computing system;
  selecting, via the first user interface, a plurality of function blocks, wherein each function block of the plurality of function blocks includes a library that represents one or more separate and distinct modular electronic circuits;
  selecting, via the first user interface, one or more communicative coupling arrangements between one or more of the selected plurality of function blocks, wherein the one or more communicative coupling arrangements define one or more data communication paths;
  accessing a compatibility database;
  automatically verifying, via access to the compatibility database, a compatibility for each communicative coupling arrangement of the selected one or more communicative coupling arrangements;
  based on said automatically verifying, producing a user-defined sensing device prototype package;
  merging, using combinatorial logic, the user-defined sensing device prototype package with one or more pre-prepared firmware templates, wherein each pre-prepared firmware template of the one or more pre-prepared firmware templates has at least one binary library associated therewith, and wherein said merging is to produce a sensing device prototype project high-level software package;

building the sensing device prototype project high-level software package to produce a loadable firmware;

loading the loadable firmware into a memory of an embedded circuit module having the sensing device that is being prototyped;

executing instructions using a processor of the embedded circuit module having the sensing device that is being prototyped; and collecting digital data produced by the sensing device that is being prototyped.

2. The computer-implemented method according to claim 1, wherein the sensing device that is being prototyped is a micro-electro-mechanical (MEMS) based sensing device.

3. The computer-implemented method according to claim 2, wherein the sensing device that is being prototyped includes at least one sensor of a microphone sensor, a time of flight sensor, or an accelerometer.

4. The computer-implemented method according to claim 1, wherein the library representing one or more separate and distinct modular electronic circuits includes electronic circuit design files each having designated inputs and designated outputs that define an electronic relationship, a logical relationship, a communicative relationship, or any combination thereof between one modular electronic circuit and another modular electronic circuit.

5. The computer-implemented method according to claim 1, further comprising:

creating a custom function block by:
selecting an electronic circuit library; and
editing at least one parameter associated with at least one component of a baseline electronic circuit defined in the electronic circuit library.

6. The computer-implemented method according to claim 1, wherein merging the user-defined sensing device prototype package with the one or more pre-prepared firmware templates includes:

accessing a conversion engine;
retrieving, by the conversion engine, parameters associated with the processor of the embedded circuit module having the sensing device that is being prototyped from a selected one of the one or more pre-prepared firmware templates;
retrieving, by the conversion engine, initialization values from the user-defined sensing device prototype package; and
directing, by the conversion engine, storage of each initialization value into a respective corresponding parameter associated with the processor of the embedded circuit module having the sensing device that is being prototyped.

7. The computer-implemented method according to claim 1, wherein the user-defined sensing device prototype package includes encoding rules arranged in a human-readable and machine-readable extensible markup language.

8. The computer-implemented method according to claim 1, wherein the sensing device prototype project high-level software package is arranged according to a C programming language.

9. The computer-implemented method according to claim 1, further comprising:

presenting at least one representation of the collected digital data produced by the sensing device that is being prototyped through a second user interface.

10. The computer-implemented method according to claim 9, comprising:

physically moving the embedded circuit module having the sensing device that is being prototyped.

11. A non-transitory computer-readable storage medium whose stored contents configure a computing system to perform a method, the method comprising:

opening a design editor via a user interface of the computing system;
selecting, via the design editor, a plurality of function blocks, wherein each function block of the plurality of function blocks includes a library that represents one or more separate and distinct modular electronic circuits;
communicatively coupling, via the design editor, various ones of the selected plurality of function blocks via one or more data communication paths;
automatically verifying compatibility for each communicative coupling arrangement of the selected one or more communicative coupling arrangements;
based on said automatically verifying, producing a user-defined sensing device prototype package;
merging, using combinatorial logic, the user-defined sensing device prototype package with one or more pre-prepared firmware templates;
generating high level source code to implement at least portions of the selected plurality of function blocks and at least portions of the one or more data communication paths, wherein said generating results in a sensing device prototype project high-level software package; and
building the sensing device prototype project high-level software package to produce a loadable firmware, wherein the loadable firmware is loaded into a memory of an embedded circuit module having a sensing device that is being prototyped and is executable using a processor of the embedded circuit module having the sensing device that is being prototyped, and wherein digital data produced by the sensing device that is being prototyped is collected.

12. The non-transitory computer-readable storage medium according to claim 11 whose stored contents configure the computing system to perform the method, wherein the sensing device that is being prototyped is a micro-electro-mechanical (MEMS) based sensing device.

13. The non-transitory computer-readable storage medium according to claim 11 whose stored contents configure the computing system to perform the method, the method further comprising:

manually selecting parameters associated with the sensing device that is being prototyped.

14. The non-transitory computer-readable storage medium according to claim 11 whose stored contents configure the computing system to perform the method, wherein the computing system is a distributed computing system.

15. The non-transitory computer-readable storage medium according to claim 11 whose stored contents configure the computing system to perform the method, the method further comprising:

verifying compatible version information for each function block of the plurality of function blocks; and
sorting the plurality of function blocks.

16. The non-transitory computer-readable storage medium according to claim 11 whose stored contents configure the computing system to perform the method, the method further comprising:
loading the loadable firmware into the memory of the embedded circuit module having the sensing device that is being prototyped;
executing instructions using the processor of the embedded circuit module having the sensing device that is being prototyped;
collecting digital data produced by the sensing device that is being prototyped;
modifying at least one parameter associated with the sensing device that is being prototyped;
re-building the sensing device prototype project high-level software package to produce an updated loadable firmware;
loading the updated loadable firmware into the memory of the embedded circuit module having the sensing device that is being prototyped;
executing updated instructions using the processor of the embedded circuit module having the sensing device that is being prototyped; and
collecting updated digital data produced by the sensing device that is being prototyped.

17. The non-transitory computer-readable storage medium according to claim 11 whose stored contents configure the computing system to perform the method, the method further comprising:
modifying at least one function block of the plurality of function blocks to create a user-defined function block; and
storing the user-defined function block in a repository.

18. The non-transitory computer-readable storage medium according to claim 17 whose stored contents configure the computing system to perform the method, the method further comprising:
opening the design editor via the user interface of the computing system; and
selecting a function block of the plurality of function blocks from the repository, wherein the function block of the plurality of function blocks is the user-defined function block.

19. An embedded circuit module A system, comprising:
an embedded circuit module, including:
a sensing device that is being prototyped;
a memory;
a processor arranged to execute software instructions stored in the memory; and
a communication interface arranged to receive communications; and
a host computing device in communication with the embedded circuit module via the communication interface, the host computing device arranged to pass a loadable firmware into the memory and configured to:
open a design editor via a user interface of the host computing device;
select, via the design editor, a plurality of function blocks, wherein each function block of the plurality of function blocks includes a library that represents one or more separate and distinct modular electronic circuits;
select, via the design editor, one or more communicative coupling arrangements between ones of the selected plurality of function blocks;
automatically verify compatibility for each communicative coupling arrangement of the selected one or more communicative coupling arrangements;
based on said automatic verification, produce a user-defined sensing device prototype package;
merge, using combinatorial logic, the user-defined sensing device prototype package with one or more pre-prepared firmware templates to produce a sensing device prototype project high-level software package, wherein each pre-prepared firmware template of the one or more pre-prepared firmware templates has at least one binary library associated therewith; and
build the sensing device prototype project high-level software package to produce the loadable firmware, wherein the loadable firmware is loaded into the memory of the embedded circuit module having the sensing device that is being prototyped and is executable using the processor of the embedded circuit module having the sensing device that is being prototyped, and wherein digital data produced by the sensing device that is being prototyped is collected.

20. The system according to claim 19, wherein the embedded circuit module is configurable as a pedometer, a smartphone, or an industrial controller.

* * * * *

UNITED STATES PATENT AND TRADEMARK OFFICE
CERTIFICATE OF CORRECTION

PATENT NO. : 10,725,746 B2
APPLICATION NO. : 16/281040
DATED : July 28, 2020
INVENTOR(S) : Mahesh Chowdhary et al.

Page 1 of 1

It is certified that error appears in the above-identified patent and that said Letters Patent is hereby corrected as shown below:

In the Claims

Column 34, Line 1, Claim 19:
"An embedded circuit module A system" should read, --A system--.

Signed and Sealed this
Eighth Day of December, 2020

Andrei Iancu
*Director of the United States Patent and Trademark Office*